US012784016B2

(12) United States Patent
Clower et al.

(10) Patent No.: US 12,784,016 B2
(45) Date of Patent: Nov. 3, 2026

(54) INSTANT FUNDS AVAILABILITY RISK ASSESSMENT AND REAL-TIME LOSS ALERT SYSTEM AND METHOD

(71) Applicant: VALID SYSTEMS, LLC, Fort Worth, TX (US)

(72) Inventors: Dyron Clower, Fort Worth, TX (US); John Templer, Fort Worth, TX (US); La Shonna Sharp, Allen, TX (US); Aaron Calipari, Clearwater, FL (US); Michael Ring, Aledo, TX (US); Michael Serrette, New York, NY (US); Nickolas Ledford, Palm Harbor, FL (US); Lawrence Dugger, Cedar Hill, TX (US); Rodney Drake, Strongsville, OH (US); Diana Hayes, Frisco, TX (US)

(73) Assignee: Valid Systems, LLC, Fort Worth, TX (US)

( * ) Notice: Subject to any disclaimer, the term of this patent is extended or adjusted under 35 U.S.C. 154(b) by 0 days.

(21) Appl. No.: 18/903,126

(22) Filed: Oct. 1, 2024

(65) Prior Publication Data

US 2025/0021953 A1 Jan. 16, 2025

Related U.S. Application Data

(63) Continuation of application No. 15/602,058, filed on May 22, 2017, now Pat. No. 12,118,524, which is a (Continued)

(51) Int. Cl.

| | |
|---|---|
| ***G06Q 20/10*** | (2012.01) |
| ***G06Q 20/04*** | (2012.01) |
| ***G06Q 20/32*** | (2012.01) |
| ***G06Q 20/40*** | (2012.01) |
| ***G06Q 40/02*** | (2023.01) |

(52) U.S. Cl.

CPC ....... *G06Q 20/1085* (2013.01); *G06Q 20/042* (2013.01); *G06Q 20/3223* (2013.01); *G06Q 20/40145* (2013.01); *G06Q 20/4016* (2013.01); *G06Q 20/405* (2013.01); *G06Q 40/02* (2013.01)

(58) Field of Classification Search

CPC .. G06Q 40/025; G06Q 20/40; G06Q 20/4016; G06Q 30/06; G06Q 40/02; G06Q 20/04; G06Q 20/382; G06Q 30/02; G06Q 40/00; G06Q 20/403; G06Q 20/4014;

(Continued)

(56) References Cited

U.S. PATENT DOCUMENTS 5,875,437 A * 2/1999 Atkins ................ G06Q 20/102 705/40
6,119,103 A * 9/2000 Basch ................ G06Q 20/4037 705/35

(Continued)

*Primary Examiner* — Hani M Kazimi
*Assistant Examiner* — Sanjeev Malhotra
(74) *Attorney, Agent, or Firm* — Gregory Perrone

(57) ABSTRACT

A real-time system and method for determining whether to invoke a fraud alert notification to a bank concerning an account holder or an item issuer following an interim determination that the account holder or item issuer has participated in a fraudulent transaction. An interim determination is updated based in part on bank transaction data received following the interim determination.

18 Claims, 11 Drawing Sheets

Related U.S. Application Data continuation-in-part of application No. 15/205,709, filed on Jul. 8, 2016, now abandoned.

(60) Provisional application No. 62/190,845, filed on Jul. 10, 2015.

(58) Field of Classification Search
CPC .... G06Q 20/405; G06Q 30/018; G07G 3/003; H04L 63/0815
USPC ... 705/14.66, 18, 26.35, 26.4, 26.41, 35, 38, 705/39, 40, 64, 67
See application file for complete search history.

(56) References Cited

U.S. PATENT DOCUMENTS

| | | | | |
|---|---|---|---|---|
| 6,205,433 | B1 * | 3/2001 | Boesch | G06Q 20/12 705/37 |
| 6,529,885 | B1 * | 3/2003 | Johnson | G06Q 30/02 705/26.4 |
| 7,191,151 | B1 | 3/2007 | Nosek | |
| 7,383,227 | B2 | 6/2008 | Weinflash et al. | |
| 7,529,710 | B1 | 5/2009 | Clower et al. | |
| 7,775,425 | B1 | 8/2010 | Mollett et al. | |
| 7,933,833 | B2 | 4/2011 | Hotz et al. | |
| 8,050,997 | B1 | 11/2011 | Nosek et al. | |
| 8,140,415 | B2 | 3/2012 | Lawrence et al. | |
| 8,571,948 | B1 | 10/2013 | Nichols et al. | |
| 8,738,526 | B2 | 5/2014 | Nosek et al. | |
| 9,923,877 | B2 | 3/2018 | Cooley | |
| 9,990,636 | B1 * | 6/2018 | Lewis | G06Q 30/016 |
| 2001/0044764 | A1 | 11/2001 | Arnold | |
| 2002/0107765 | A1 | 8/2002 | Walker | |
| 2003/0055783 | A1 | 3/2003 | Cataline et al. | |
| 2003/0182214 | A1 * | 9/2003 | Taylor | G06Q 20/4014 705/35 |
| 2003/0208439 | A1 * | 11/2003 | Rast | G06Q 20/403 705/38 |
| 2004/0078340 | A1 * | 4/2004 | Evans | G06Q 20/401 705/64 |
| 2004/0128229 | A1 | 7/2004 | Raines et al. | |
| 2005/0091524 | A1 | 4/2005 | Abe et al. | |
| 2005/0102226 | A1 | 5/2005 | Oppenheimer et al. | |
| 2005/0114367 | A1 | 5/2005 | Serebrennikov | |
| 2005/0125295 | A1 | 6/2005 | Tidwell et al. | |
| 2005/0125296 | A1 | 6/2005 | Tidwell et al. | |
| 2005/0125338 | A1 | 6/2005 | Tidwell et al. | |
| 2005/0125339 | A1 | 6/2005 | Tidwell et al. | |
| 2005/0125350 | A1 | 6/2005 | Tidwell et al. | |
| 2005/0222963 | A1 * | 10/2005 | Johnson | G06Q 30/02 705/67 |
| 2006/0106717 | A1 | 5/2006 | Randle et al. | |
| 2006/0213979 | A1 | 9/2006 | Geller et al. | |
| 2007/0005498 | A1 | 1/2007 | Cataline et al. | |
| 2007/0162387 | A1 | 7/2007 | Cataline et al. | |
| 2007/0203826 | A1 * | 8/2007 | Russell | G06Q 20/4016 705/38 |
| 2007/0282674 | A1 | 12/2007 | Gomes et al. | |
| 2008/0040249 | A1 | 2/2008 | Richard et al. | |
| 2008/0046368 | A1 | 2/2008 | Tidwell et al. | |
| 2008/0183519 | A1 | 7/2008 | King et al. | |
| 2008/0222002 | A1 * | 9/2008 | Hu | G07G 3/003 705/38 |
| 2008/0301040 | A1 | 12/2008 | Knudson et al. | |
| 2009/0150269 | A1 | 6/2009 | Bishop et al. | |
| 2010/0064349 | A1 | 3/2010 | Randle et al. | |
| 2010/0287099 | A1 * | 11/2010 | Liu | G06Q 20/40 235/380 |
| 2010/0305993 | A1 | 12/2010 | Fisher | |
| 2011/0047098 | A1 | 2/2011 | Erlanger | |
| 2011/0093384 | A1 | 4/2011 | Oppenheimer et al. | |
| 2011/0112931 | A1 * | 5/2011 | Hu | G06Q 30/0609 705/26.35 |
| 2011/0281630 | A1 | 11/2011 | Omar | |
| 2012/0233064 | A1 | 9/2012 | Cataline et al. | |
| 2013/0030993 | A1 | 1/2013 | Peace et al. | |
| 2013/0066771 | A1 * | 3/2013 | Ciurea | G06Q 30/0241 705/39 |
| 2013/0212008 | A1 | 8/2013 | Edwards et al. | |
| 2013/0254049 | A1 * | 9/2013 | Todd | G06Q 30/0215 705/18 |
| 2013/0339189 | A1 * | 12/2013 | Minerick | G06Q 50/16 705/26.41 |
| 2014/0089191 | A1 | 3/2014 | Brown | |
| 2014/0172687 | A1 | 6/2014 | Chirehdast | |
| 2014/0195416 | A1 | 7/2014 | Linscott et al. | |
| 2014/0258125 | A1 | 9/2014 | Gerber et al. | |
| 2015/0012399 | A1 | 1/2015 | Ceribelli | |
| 2015/0142545 | A1 | 5/2015 | Ceribelli | |
| 2015/0228018 | A1 * | 8/2015 | Richman | G06Q 30/0226 705/38 |
| 2015/0348186 | A1 * | 12/2015 | Samteladze | G06Q 40/03 705/38 |
| 2016/0019536 | A1 | 1/2016 | Ortiz et al. | |
| 2016/0034971 | A1 * | 2/2016 | Sycoff | G06Q 40/04 705/14.66 |
| 2016/0086263 | A1 * | 3/2016 | Weinflash | G06Q 40/03 705/38 |
| 2016/0098713 | A1 | 4/2016 | Fuerstenberg et al. | |
| 2016/0189292 | A1 | 6/2016 | Deshpande et al. | |
| 2016/0210626 | A1 | 7/2016 | Ortiz et al. | |
| 2016/0224964 | A1 * | 8/2016 | Vergari | G06Q 40/02 |
| 2017/0017958 | A1 | 1/2017 | Scott et al. | |
| 2017/0068938 | A1 | 3/2017 | Narayana et al. | |
| 2017/0069027 | A1 | 3/2017 | Narayana et al. | |
| 2017/0076377 | A1 | 3/2017 | Myers | |
| 2017/0161735 | A1 | 6/2017 | Ortiz et al. | |
| 2017/0249622 | A1 | 8/2017 | Ortiz et al. | |
| 2017/0330181 | A1 | 11/2017 | Ortiz et al. | |
| 2018/0293573 | A1 | 10/2018 | Ortiz et al. | |
| 2019/0108524 | A1 | 4/2019 | Nicholson et al. | |
| 2019/0114702 | A1 | 4/2019 | Nicholson et al. | |
| 2019/0122194 | A1 | 4/2019 | Narayana et al. | |
| 2019/0130489 | A1 | 5/2019 | Narayana et al. | |
| 2019/0244248 | A1 | 8/2019 | Purves et al. | |
| 2020/0034753 | A1 | 1/2020 | Hammad | |
| 2020/0184526 | A1 | 6/2020 | Ceribelli | |
| 2020/0364677 | A9 | 11/2020 | Peace et al. | |

* cited by examiner

INSTANT FUNDS AVAILABILITY RISK ASSESSMENT AND REAL-TIME LOSS ALERT SYSTEM AND METHOD

This application is a continuation application of and claims priority to co-pending U.S. application Ser. No. 15/602,058, filed May 22, 2017, which is a continuation-in-part of U.S. application Ser. No. 15/205,709 filed Jul. 8, 2016, which claimed priority to Provisional Application No. 62/190,845 filed Jul. 10, 2015, and each of which is incorporated in its entirety herein by reference.

TECHNICAL FIELD

This document relates to systems for instant funding and payment of financial items at the point of deposit and a system for providing real time alerts for fraudulent item deposit attempts at the point of deposit.

BACKGROUND

Some consumer's bank account balances are low in relation to the amount of a check that the consumer is seeking to deposit or cash. Historically these consumers, often referred to as "underbanked", do not have available to them a bank or other financial institution where it may deposit checks or immediately cash them as banks seldom honor such items due to the risk that the check will be return due to insufficient funds (NSFs). In the event that a bank would receive a check for deposit, it would place a hold on the check deposited, meaning that the balance will not be made available to the customer until the deposited funds are collected from the paying bank. This can take up to fourteen days as an item runs through the various clearinghouses and Federal Reserve System.

This "hold" process placed on deposits made by the underbanked presents a problem for consumers in need of immediate funds. As a result, a number of non-bank outlets have become available to consumers in need of immediate payment of cash at the time of deposit of a check. Entities such as payday lenders and check cashing enterprises have become a viable alternative for the unbanked, as funds are made available to the customer immediately. In return, however, these lenders and check cashers charge significant fees to the consumer. This fee is necessitated to offset the risk borne by the enterprise that the deposited check will in fact be returned due to NSF, leaving the lender or check casher with little recourse against the customer who likely has spent the funds at issue or against the payor of the check. It is estimated that roughly \$1.2 billion in checks are cashed annually by checking enterprises and roughly \$40 billion by payday lenders. Credit cards are also used by consumers to bridge the gap between paychecks as a form of a short term loan. As such, credit card companies benefit in the form of payment of interest accrued and transaction fees.

From the banking world's perspective, these alternative sources of funding for the underbanked result in the loss of customer fees, which is a significant facet of bank revenue. As such, traditional banks need to implement its own system for instant satisfaction or funding of items presented for deposit. Banks are regulated, however, in terms of the level of fees and interest it may charge customers. Accordingly, banks need a system for instantly and accurately evaluating the risk associated with immediately funding an item presented by a customer for payment.

When checks are presented for deposit at a financial institution the availability of the deposited funds to the account is subject to bank policy and governed under Regulation CC (of 12 C.F.R. Part 229). Most financial institutions delay in providing the depositor full access to those funds by at least one business day due to the risk associated with the clearing of those funds while the check is presented to the financial institution on which the funds are drawn. In the event a check is returned unpaid, the depository financial institution could be left with a financial loss if the depositor has used the funds in their account.

Under the current state of the art, items presented for deposit that invoke fraud concerns are handled by bank personnel. Such items are provided to bank personnel typically in an "end of the day" context in which personnel review a listing of various items that may be fraudulent. Additional research and review of these items may uncover or eliminate the suspected fraud. This delay in the analysis, however, does not address the real-time interest of the depository bank to place an immediate deposit hold at the point of and at the time of deposit.

There is a growing need within the fraud divisions of the banking industry to isolate and manage negative patterns of fraud behavior that can lead to tangible loss for the Bank. Large to mid-size Banks have identified several standard and unchanged fraud behaviors, which require manual review by a bank fraud representative of the deposit items with relative likelihood of fraud pattern matching. The manual review process may or may not be accurately followed, which can then continue to lead to further bank loss. Smaller Banks have minimal staffing to be able to isolate fraud behavior, or put into place a manual deposit item review process.

Primary challenges for banks continue to be (a) continual fraud behavior changes; (b) expedient fraud notification; and (c) transit payer pattern activity outside of the bank's data sources, among others.

What is needed, therefore, is an integrated fraud alert system and method that provides immediate input at the point of deposit that enables the depository bank to make a virtually instant decision on whether or not to place a hold on the item or at least present it a bank fraud representative for review.

BRIEF DESCRIPTION OF DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
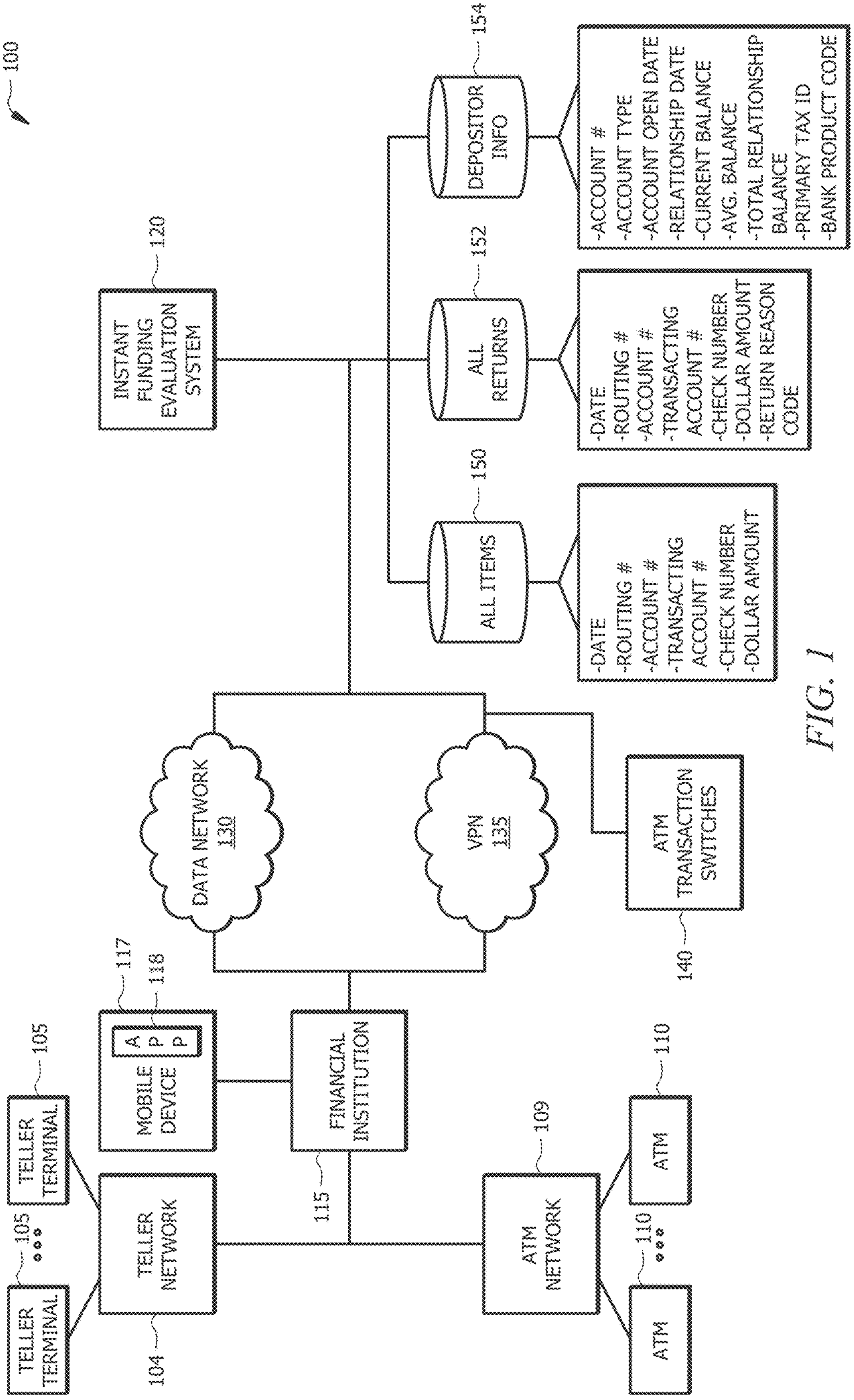
FIG. 1 is a diagram of a network architecture of an embodiment of the presently disclosed accelerated funding evaluation system.

Before undertaking the detailed description below, it may be advantageous to set forth definitions of certain words and phrases used in connection to the disclosed exemplary embodiments: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the subject matter of this application has been described with reference to illustrative embodiments, this description is not intended to be construed in a limiting sense. Various modifications and combinations of the illustrative embodiments as well as other embodiments will be apparent to persons skilled in the art upon reference to the description. It is, therefore, intended that the appended claims encompass any such modifications or embodiments. This general processes and systems described herein may be modified heavily depending on a number of factors, with rearrangement and/or addition/deletion of steps anticipated by the scope of the present disclosure. Integration of this and other preferred exemplary embodiment methods in conjunction with a variety of preferred exemplary embodiment systems described herein is anticipated by the overall scope of the presently disclosed system.

The present disclosure describes a system for providing risk analytics through which an item presented for payment can be instantly decisioned to determine if a customer qualifies for accelerated credit. Allowing the customer to pay a fee or comply with other terms at time of transaction for accelerated credit to their bank account enables customers to avoid the additional stop and fees associated with alternative providers and create a new revenue stream for the Institution. The system enables banks to decrease the risk of accepting and advancing payment of an item being returned unpaid by providing a comprehensive risk assessment capability based on bank collected and compiled data associated with bank items, returned items and depositor information stored in bank or third party, non-public, data stores. With the Instant Funding System, banks are able to offer available funds instantly from items sourced to various entities and presented by a particular customer from with a decreased risk of loss due to unpaid items by tracking and analyzing daily check transactions processed by a particular bank on the previous business day; all returned checks both presented to the bank for deposit (sourced to other institutions) and sourced to the bank. Analysis of the depositor's information file is also performed. This information is stored in various databases associated or operated by the banks or third parties and used to facilitate deposit transactions processed in a teller line, through a mobile device via a dedicated application, or an automated teller machine (ATM) to determine the level of risk tolerance for a particular item. Based on the level of risk attributable to an item, the bank can determine whether to instantly fund the item or require the item to proceed through the standard clearing process with associated Federal Reserve holds, etc.

The system also provides banks with a recommendation as to whether to instantly fund an item presented for deposit either at the teller terminal, an ATM terminal or via a mobile device. The recommendation is generated through an automated risk analysis. The automated risk analysis is performed by accessing various items of data associated with items presented to a bank on a prior business day, return items to and from the bank, and the depositor's information. The system may rely on data from a single bank to process instant funding requests by that bank's customers. Alternatively, the relevant data collected from several banks may be shared by the several banks in making risk assessment determinations. Similarly, banks may be part of a network of banks and relevant customer and transaction data may be shared over a wide area network among banks using the instant funding evaluation system. The items of data associated with the items presented to the bank on the prior business day may be referred to as the All Items File (AIF). This file includes data points including the date, routing and account numbers of an item, the transacting account number, the check number and the dollar amount of the item.

The file of items returned to the bank may be referred to as the All Returns File (ARF). This file includes both incoming and outgoing returned items, including the date on which the item was returned, the routing and account number of the returned item, the transacting account number, the check number, the dollar amount of the item, and a return reason code representing the reason that the item was returned. The file including information pertaining to the depositor may be referred to as the "Depositor Information File" (DIF). The DIF includes information such as the depositor's account number, account type, account open date, relationship date, current account balance, average account balance, total relationship balance, primary account holder's tax identification number, and bank product code.

At the teller terminal, instant funds may be available. In one embodiment of the presently disclosed system, teller instant funds capability is integrated in the teller system via application program interface (API) and is compatible with image deposit systems. In another embodiment, the presently disclosed system is a standalone system that does not need to be integrated into existing Teller utilized terminals or software but may be accessed by the Teller from the terminal to initiate requests for immediate funding. In one embodiment of the standalone system, the Teller or bank personnel may log into a secured website dedicated to processing requests for immediate funding. Functionally the IFES processes requests for immediate funding in virtually the same manner regardless of whether the IFES is an integrated or standalone system. Teller terminals call a remote service via a wide area network such as the Internet for real time evaluation of each item presented for deposit and to submit check data (such as codeline data) as well as the depositor's account number. The depositor's account number is linked to the DIFs that are updated daily. Based on the information gleaned from the DIF, the system performs a risk analysis and will authorize or deny accelerated funding.

In another embodiment of the present accelerated fund availability system, a customer presents an item for deposit via a mobile device. The accelerated funding capability is integrated into mobile banking platforms and mobile deposit products. The mobile banking platform will interface with module to receive check data and the depositor's account number, via an image or entry of the information. The depositor's account number is linked to the DIF that is updated and provided daily. The mobile deposit application embodying this aspect of an embodiment of the present accelerated funding system receives confirmation through the user's mobile device that in the event that funding is approved by the bank, the customer accepts the terms of accelerated funding and fees are allocated to the customer appropriately.

The mobile platforms made available to bank customers through software provided by the bank facilitate transmission and receipt of data to the accelerated funding system of the present invention. Just as an established banking customer may deposit funds by transmission of an image capture of the item for deposit, the accelerated funding system relies on data retrieved from the check image to facilitate the approval process. If a check receives a positive guarantee decision, the mobile customer is offered accelerated funding with a description of term. If an approval decision is not made, then the customer is made no offer for accelerated funds and if desired the item will run its course through the hold periods common to the Federal Reserve System. If the customer's deposit is accepted for instant funding, the customer account is immediately credited with the amount of the item.

Similar aspects of the present accelerated funding system are implemented though the ATM banking capability made available to customers. The risk allocation aspects of the presently described accelerated funding system are integrated into the bank account processing system to provide accelerated funding decisions for checks presented at an ATM for deposit. The check's codeline data is also entered at the ATM terminal. An ATM terminal has a user interface that may include a graphical user interface, through which the user may interact with the bank at least at some distance away from the bank to execute transactions. If accelerated funding is granted, the depositor's account is credited immediately with the relevant amount of funds and the customer, in turn, is permitted to immediately draw from the funds deposited. In the ATM paradigm, multiple components and multiple vendor products likely comprise the ATM platform, including the point of transaction ATM. Modules implementing the functionality of the described accelerated fund capability may be integrated into systems comprising products provided from a number of sources to in turn provide seamless incorporation into existing ATM systems and in turn a seamless transition for users.

The result of the risk analysis is a transaction approval or denial recommendation. The bank may automatically perform the transaction in accordance with the recommendation (e.g., when the transaction is performed at an Automated Teller Machine (ATM) or via mobile device) or may ignore the recommendation and approve or deny the transaction based on other factors (e.g., when the transaction is performed at a teller terminal and a bank supervisor chooses to ignore the recommendation). The risk rules and thus the risk analysis may be tailored to each bank, thereby enabling each bank to vary the rules in accordance with its particular risk sensitivity.

Referring to FIG. 1, a system 100 for approving accelerated funding of items presented for deposit and collecting and monitoring risk assessment data associated to the accelerated funding decision includes one or more teller terminals 105 associated with teller network 104 and one or more ATMs 110 associated with ATM network 109, both of which are associated with a financial institution or bank 115. Customers may interface with the bank 115 and their associated accounts via a mobile device 117 on which resides an application 118 specifically tailored to interact with the bank in which the customer has an account. In one embodiment, teller terminals 105 communicate with Instant Funding Evaluation System (IFES) 120 across a data network 130, and the ATMs 110 communicate with IFES 120 across a virtual private network 135 through ATM transaction switches 140.

The data network 130 is a delivery network that enables direct or indirect communications between the teller terminal 105, IFES, and the third party identity verification data stores (optional), irrespective of physical separation. Examples of the data network 130 include the Internet, the World Wide Web, LANs, WANs, analog or digital wired and wireless telephone networks (e.g., PSTN, ISDN, and xDSL), radio, television, cable, satellite, and/or any other delivery mechanism for carrying data.

ATM transaction switches 140 include an ATM transaction processor and an ATM terminal driver that enable exchange of transactional data between the ATM 110 and the IFES 120 across the virtual private network 135. In one embodiment, the ATM transaction switches 140 enable communications using the 912 messaging protocol.

Bank 115 may be any financial institution. Bank 115 may permit customers to open bank accounts (e.g., checking or savings accounts) and may provide other types of financial services (e.g., loans). Bank 115 typically includes one or more teller terminals 105 and one or more ATMs 110. Teller terminals 105 and ATMs 110 may be local to bank 115 or may be remote to bank 115 but in communication with the bank 115 over a public or private data network.

The presently disclosed systems and methods make an authorization decision on check cashing or check deposits, utilizing a contribution of financial institution data allowing for financial institutions to provide the depositor or check casher (collectively referred to as the transactor) "Accelerated Funds Availability". "Accelerated Funds Availability" is defined as cash back or deposited funds made available sooner to the transactor than a financial institution's published availability policy. Data from the financial institution includes 1) Check Deposit Data, 2) Check Performance Data, 3) Deposit Account Overdraft Limits and 4) Deposit Account Attributes. These parameter form the basis of rule sets through which the risk level associated with a particular item presented to a bank for deposit is analyzed.

Check Transaction Data includes at a minimum the Routing Number of the Check, Account Number of the Check, Check Number of the Check, Dollar Amount of the Check and a Unique Account Identifier of the transacting account.

Check Performance Data. Deposit Performance Data includes both Check Returns and Administrative Adjustments. At a minimum this data will include the Routing Number of the Check Returned, Account Number of the Check Returned, Check Number of the Check Returned, Dollar Amount of the Check Returned and a Return/Adjustment Reason. Deposit Account Overdraft Limits include the dollar amount assigned to the deposit account that can be overdrawn and the Unique Account Identifier. Deposit Account Attributes includes at least the Unique Account Identifier, account type, account open date and balance.

IFES 120 compiles information regarding banking items, returns and depositor information. This data is stored in an All Items data store 150, an All Returns data store 152 and a Depositor Information data store 154. Associated depositor information files stored in depositor information data store 154 may include information upon which the bank, via the teller terminal 105 for example, may verify account holder identity.

Extract, Transform, Load (ETL) Process. Transmission of data in All Items data store 150, All Returns data store 152 and Depositor Information data store 154 received from the financial institution or bank 105 could occur via various processes. In one embodiment, these files will either be pushed by financial institution 105 to an IFES operator controlled landing zone, or pulled from financial institution 105 controlled landing zone by the IFES operator. The files from the financial institution are derived from one or more internal systems. Some such systems may employ antiquated mainframe systems running COBAL. This requires a firm understanding by the IFES operator of the file format to uniquely code a file conversion process. Conversion of data to a format that current databases can interpret is necessary. For example, a client may provide EBCDIC files that would require coding against existing copybooks and subsequent conversion of those files into ASCII format.

Once the files from the financial institution are properly converted into a readable format, they will be imported into a data store designed specifically for each financial institution. The relationship architecture of each data store 150, 152 and 154 is detailed to account for specific data types, field lengths, primary keys, foreign keys and update mechanism. The update mechanism of each file is important, as it will determine how data is loaded into the data store. For example, data from a deposit transaction is incremental as it will include new information daily related to a specific account. Account data files, on the other hand, will be daily full loads, meaning the account files will always contain all account data and be a repeat of information day over day, with potential updates to specific fields in the account data files. The update mechanism will result in specific coding for each data file as they are loaded into the data store.

The entirety of the ETL process is automated with unique scripts generated for each financial institution. Throughout the automated process there are specific monitoring and alert rules in-place to ensure continuity and success during the ETL process; from receipt or files to loading the data store. The specific ETL process described above is only exemplary. Other means for executing the extraction, transformation and loading of data used in connection with the immediate or instant funding evaluation system described herein may be employed without departing from the spirit and scope of the invention.

Data Staging. Data staging is the process of importing and converting data from each financial institutions data store into a single cohesive architecture. Cohesive architecture is a vital component to all downstream activity that will be performed against the data that allows for a single IFED operator controlled area that can accept any type, amount or format of financial institutions data.

Upon import into the staging area, data is cleaned and converted against IFED operator proprietary algorithms enabling the data to be utilized in optimal IFED operator format for analysis, grade generation, and modeling. In addition, multiple statistic and aggregate tables are generated and continuously maintained during the data staging process.

The downstream activity performed against the financial institutions' data after being properly staged includes the generation of the IFED grade, as well as being accessed during real-time processing of transactions generated from the financial institutions.

Data Storage. In one embodiment, a component to the process involving the financial institution data is the security around the data itself. This includes the moment the data is received, the processing of the data, "at-rest" storage of the data and accessing the data. The transmission of the data from the financial institutions occurs via secure channels, SFTP is the default delivery mechanism ensuring that the transmission is encrypted between parties. Once the data is received, during the ETL process the Personally Identifiable Information (PII) is encrypted prior to any information being imported into the financial institutions data store. During the IFES operator encrypting process of PII data a Message Authentication Code (MAC) is also created, this allows for optimized search and compare, but more importantly allows the data to be searched and compared without ever having to be un-encrypted. The approach of using a MAC is similar to using a hash, but it requires a secret key to calculate the MAC. This secret key is known typically only to key personnel of the IFES operator. During the Data Staging process the PII information is always in an encrypted state. Data transmission is also an area where encrypted communication is employed, all traffic from web, application, and database servers is SSL encrypted. Finally, all PII data that is stored within the IFES operator databases is encrypted "at-rest". The data storage technique described herein are exemplary and other means of data storage used in connection with the immediate or instant funding evaluation system described herein may be employed without departing from the spirit and scope of the invention.

Decision Variable Creation. Utilizing both financial institution and VALID data, comprehensive statistical attribute tables are developed and utilized by the varying VALID Risk Models to generate a "VALID Grade" for each deposit authorization attempt. The attributes fluctuate, based on variations in static data points and/or shifts in behavior patterns. Development and management of the statistical attribute tables take into account key data components. These components include, but are not limited to:

Payer Profile—utilizes check transaction and paired return data for a unique routing and account number. The variables allow for a summarized viewpoint of the Payer and Payer performance over a defined span of time.

Payee Profile—utilizes Deposit Account data points, Deposit Account Overdraft Limits and Joint Payer/Payee Profile transaction data. These variables allow for a summarized viewpoint of the Payee over a defined span of time.

Transaction Authorization Process. When an item is presented for check cashing or deposit an Authorization Attempt to the IFES Authorization Engine will be made by the financial institution. When an Authorization Attempt is made, the data submitted as part of the transaction message, related to the check details and the transactor is matched against the Payer and Profile statistical attribute tables to ascertain an IFES Grade within a Preprocessing Database. In the event that the Authorization Attempt is outside of acceptable IFES Grade limits, the Authorization Engine will query against IFES base rule and V+ systems, where additional and more detailed risk model variables are configured and maintained. All transaction information and attributes returned are interrogated within the Authorization Engine against a series of configurable rules to issue a response. A positive response from the Authorization Engine will indicate to the financial institution to provide "Accelerated Funds Availability" to the transactor.

While FIG. 1 depicts one bank 115, one or more other banks and associated teller terminals and ATMs also may communicate with IFES 120 to gain accelerated funding of items.

Teller terminals 105 are computer terminals configured to enable a teller affiliated with the bank 115 to verify the identity of a customer presenting an item for deposit and funding availability and enrolling customers into the IFES system, if not already enrolled. Teller terminals 105 also may be configured to process transactions of customers and its primary function is to assist account holders in withdrawing funds from and depositing finds to a savings and/or a checking account. Teller terminal 115 may also be configured to generate reports related to enrolled non-account holder transaction histories. The teller terminal 105 may include driver's license decoding software, a fingerprint scanner for biometric identification, and a check imaging device. In other implementations, the teller terminal 105 may use other types of biometric identification mechanisms. For example, the teller terminal 105 may include identification software that verifies the identity of a non-account holder based on an image of the non-account holder's face, a palm print, DNA analysis, a retinal scan, or an analysis of the non-account holder's voice. In one embodiment, teller terminal 105 is a personal computer having peripheral components used to collect data from the customer (e.g., a check imager, a card reader, and a fingerprint scanner) and with a secure connection to the Depositor Information data store 154 over the data network 130.

Teller terminal 105 is configured to enable a teller to enroll a customer into IFES 120 or updating enrolled customer information by collecting data that identifies the customer and communicating the collected data to IFES 120. For example, the teller terminal 105 may collect the identity data by swiping the customer's driver's license, orally requesting the identity data from the customer and manually entering the data, and/or enrolling a biometric template of the customer (e.g., a template of the fingerprints of both index fingers of the non-account holder). IFES 120 uses some or all of the collected identity data to access identity verification data stored in Depositor Information data store 154, locally, or in a third party identity verification data stores 160. IFES 120 compares the accessed identity verification data to the collected identity data to validate the non-account holder's identity. If the identity of the customer is successfully validated and the customer holder was not previously enrolled, IFES 120 enrolls the customer into the accelerated fund availability system.

In one embodiment, ATM 110 may be, among other things, a check cashing unit that is configured to enable a customer of bank 105 to cash a check or a unit for a customer to make withdrawals from an account, transfer funds, or make deposits. In operation, a bank customer is provided with a card or other token that uniquely identifies a bank customer to one of more accounts with the bank. ATM 110 includes card reading capability enabling reading of customer account and authentication information via the magnetic strip or security chip embedded in the card. Alternative means may be employed via ATM 110 to allow a customer to transact bank business via that terminal, such as a key pad for manual entry of customer identifying data, such as his or her driver's license number, social security number (SSN), or other identification number. The customer at ATM 110 may also insert the amount of the check to be cashed via a key pad or other interface device, and inserts the check into the designated receptacle. In some implementations, the customer may be required to provide biometric data. ATM 110 may include biometric identification functionality similar to those included in teller terminal 105 as described above. ATM 110 typically includes a check imaging device that produces images of the front and back of the check, validates the MICR ("magnetic ink character recognition") code on the check, and reads designated zones of the check. In one embodiment, ATM 110 is a Diebold Opteva 720 with an IDM operating on an Agilis 912 platform.

ATM 110 is configured to send data relevant to the transaction, including customer identity information (e. g., biometric data and identification number) to ATM transaction switch 140, which converts the received transactional data into a format understandable by IFES 120 for accelerated processing and also sends relevant converted transactional data to the appropriate data store. IFES 120 determines whether to make the item presented by the customer immediately available for funding as will be described. Approval of the transaction for accelerated funding requires processing of data in All Items data store 150, All Returns data store 152 and Depositor Information data store 154 and performing a risk analysis in accordance with risk rules established and maintained for the particular bank 115 associated with the ATM 110. IFES 120 may return either an accelerated funding approval indicator or notification to the customer via ATM 110. Upon approval for accelerated funding, the customer may access the relevant amount of funds immediately via ATM 110, or if denial was received access only those funds available in the ordinary course of the bank's item funding policy.

Figure 2:
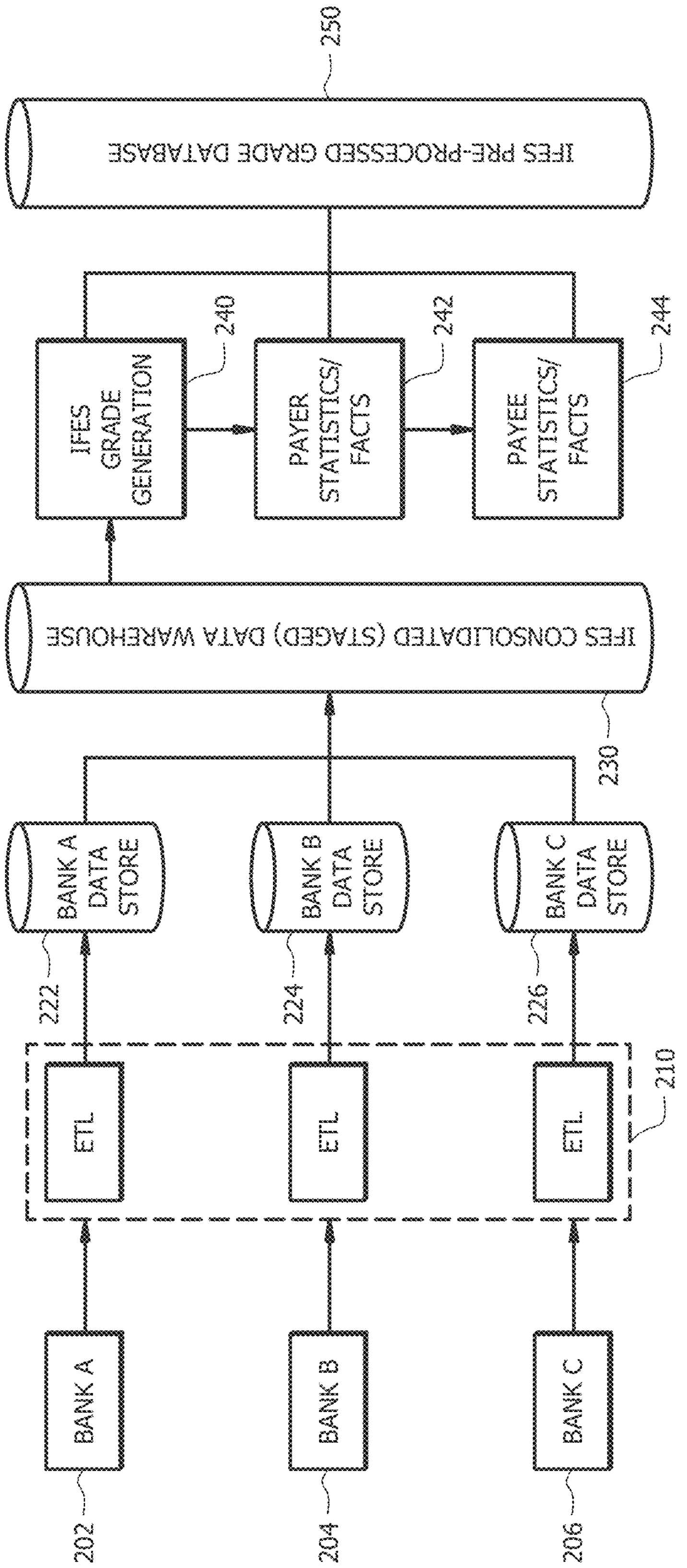
FIG. 2 is flow diagram of methods performed by an embodiment of the presently disclosed accelerated funding evaluation system.

FIG. 2 is a diagram depicting the pre-processing operational components of the present Instant Funding Evaluation System, that is, receipt of relevant information from the various participating financial institutions that is used by IFES 120 to evaluate whether a presented item is worthy of accelerated funding. As seen in FIG. 2, various participating banks 202, 204 and 206 make prior or current day data available to IFES. This data is gathered by banks 202, 204 and 206 throughout the banking day and stored in data stores corresponding to banks 202, 204 and 206 in the various data stores 222, 224, and 226. The operational components and flow diagram of FIG. 2 depicts the flow of information from the participating financial institution to the IFES pre-processing data store.

As shown, each day, various transaction and customer account related items are made available to IFES. In one embodiment, data is retrieved from the individual banks through either a push or pull process. In the example, three participating banks collect transaction and customer data throughout the business day. Prior to storage in the corresponding data store for each bank, this data for each then undergoes an Extract, Transform and Load (ETL) process at stage 210, as described above. Via the ETL process, pertinent banking data necessary for ultimate effective use by IFES is extracted from the daily or otherwise periodically collected data. This data is then transformed or converted into data readable by the IFES system. Once the data is so converted, the converted data is loaded in the associated bank data stores 222, 224 and 226 as previously described. These data stores contain what may be characterized as All Items data, All Returns data and Depositor Information data.

This data stored in bank associated data stores may be extracted, transformed and loaded in virtually real time throughout the banking day, or may undergo the ETL process at regularly scheduled intervals, or at the end of the business day.

Recall that once bank data is stored in local data stores 222, 224 and 226, the data is in a form usable by IFES. At this juncture, stored data is transmitted to an IFES Consolidated Data Warehouse (CDW) 230. The data stored in CDW 230 is staged. Staging is the process of importing and converting data from each financial institutions data store into a single cohesive architecture. Cohesive architecture is a vital component to all downstream IFES processing of the data by a single IFES operator controlled system that can accept any type, amount or format of financial institutions data.

Once received into an IFES staging area, data is cleaned and converted against IFES operator proprietary algorithms enabling the data to be utilized in optimal IFES operator format for analysis, grade generation, and modeling. In addition, multiple statistic and aggregate tables are generated and continuously maintained during the data staging process.

Downstream activity performed on the previously processed (ETL) financial institution data after staging includes the generation of the IFES grade, as well as being accessed during real-time processing of transactions generated from the financial institutions. Another vital component to the process involving the financial institution data is the security around the data itself. This includes the moment the data is received by IFES, the processing of the data, "at-rest" storage of the data and accessing the data. As discussed, the transmission of the data from the financial institutions is carried over secure channels. In one embodiment, SFTP is the default delivery mechanism ensuring that the transmission is encrypted between parties. Once the data is received, during the ETL process the Personally Identifiable Information (PII) is encrypted prior to any information transmitted to a financial institutions data store. During the IFES operator encrypting process of PII data, a Message Authentication Code (MAC) is also created, this allows for optimized search and compare, but more importantly allows the data to be searched and compared without ever having to be unencrypted.

The approach of using a MAC is similar to using a hash, but it requires a secret key to calculate the MAC. This secret key is known typically only to key personnel of the IFES operator. During the Data Staging process, PII information remains encrypted. Data transmission and traffic from wide area networks, such as the Internet, via mobile applications, and between database servers is SSL encrypted. PII data that stored within the IFES operator databases is encrypted "at-rest".

Once bank data is collected and stored in CDW 230, the data undergoes the grade generation process at step 240 of the process. A key facet of the grade generation process is the creation of decision variables. Utilizing both financial institution and IFES data, IFES develops and employs comprehensive statistical attribute tables by the various IFES risk models to Grade for each item presented for deposit and approval for accelerated availability. The relevant attribute values fluctuate according to changes in static data points or shifts in behavior patterns.

Development and management of the statistical attribute tables leverage key data components, including but not limited to payer profile data 242 and payee profile data 244. Payer data in the form of check transactions and paired return data is used to provide a unique routing and account number. Payee data in the form of deposit account data points, deposit account overdraft limits and joint payer—payee data is used to ultimately arrive at variables that lend themselves to a summarized viewpoint of the payee over a defined span of time. Grades calculated based on historical information are stored and maintained in an IFES Pre-Processing Grade Database 250. These grades are later used by IFES to evaluate whether accelerated funds should be made available on an item at the point of presenting the item.

Once daily bank transaction information, including payer and payee statistical data, is collected, coded, stored in the various bank data stores, staged aggregated and consolidated at the CDW and IFES computes a grade that will be used by the IFES system in determining if and individual customer item presented to a member bank should be authorized for accelerated fund availability. When a bank customer presents an item for check cashing or deposit, an Authorization Attempt is made and the process of the IFES Authorization Engine to determine if accelerated funding should be made available by the bank is invoked. When an Authorization Attempt is made, data is submitted as part of the transaction message. The data submitted includes the check details (check number, payer bank, amount) and the customer requesting the transaction is matched against payer and profile statistical attribute tables to ascertain an IFES Grade within Preprocessing Database 250. Once the transaction is received via an authorization attempt, IFES determines if the transaction falls within IFES grade acceptable range. To make this determination, the IFES Authorization Engine runs a query against an IFES base rule set where additional and more detailed risk model variables are configured and maintained. In one embodiment an additional layer of querying occurs where additional information concerning the payer and payee is obtained from the database. This additional layer of analysis facilitates potentially higher transaction approval rates and decreased losses. All transaction information and attributes returned are interrogated within the Authorization Engine against a series of configurable rules to issue a response. A positive response from the Authorization Engine will indicate to the financial institution to provide "Accelerated Funds Availability" to the customer.

Figure 3:
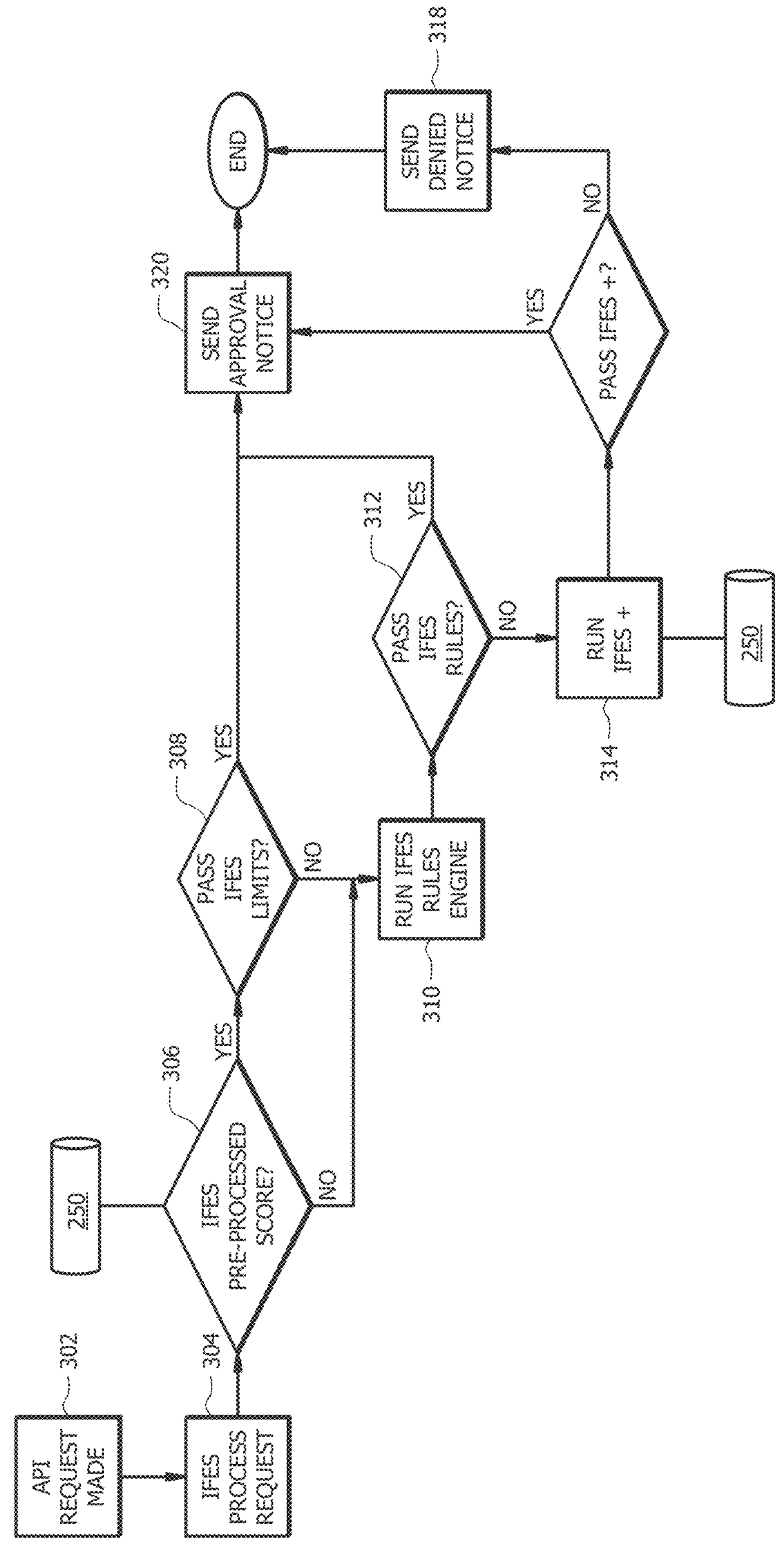
FIG. 3 is flow diagram of methods performed by an embodiment of the presently disclosed accelerated funding evaluation system.

FIG. 3 is a flow diagram of a process performed by the Instant Funds Evaluation System of the present invention with respect to a transaction once an Authorization Attempt is received by IFES. As generally illustrated herein, the system embodiments of the present disclosure can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. The present disclosure includes this type of computer readable media within its scope. The presently disclosed system anticipates a wide variety of variations in the basic theme of construction. The embodiment presented do not represent the entire scope of possible usages. They are meant to cite a few of the almost limitless possibilities. One skilled in the art will recognize that other embodiments are possible based on combinations of elements taught within the above description.

At step 302, an application program interface (API) request is received by a member bank as a result of the item presented by that bank's customer for deposit or cashing. Once recognized as a request from a member bank at step 304, the process continues at step 306 where the system queries whether a pre-processed score pertaining to the transaction information associated with the received request is stored in the preprocessing database 250. This query could be performed according to the payer or payee name or account number associated with either. If the answer to this inquiry is no, then IFES has no historical data upon which to grade the transaction and IFES analyzes the information available according to its rules engine at step 310.

If, on the other hand, the answer at step 306 is yes, the process proceeds to another query at step 308 to determine if, based on the information received associated with the pending funding request and the grade information retrieved from preprocessing database 250, the funding request falls within the range of acceptable pass client limits for this customer. In other words, based on the grade stored in preprocessing database derived from historical information associated with this transaction in the form of All Item information, All Returns information and Depositor information, the deposit request may immediately qualify for accelerated funding. The process then concludes at step 320 with IFES sending a "green" or approval notification to the bank authorizing the transaction for accelerated funding. As a result, on the bank side the funds will either made immediately available for deposit in the customer's account and the account credited or the item will may be cashed.

Figure 8:
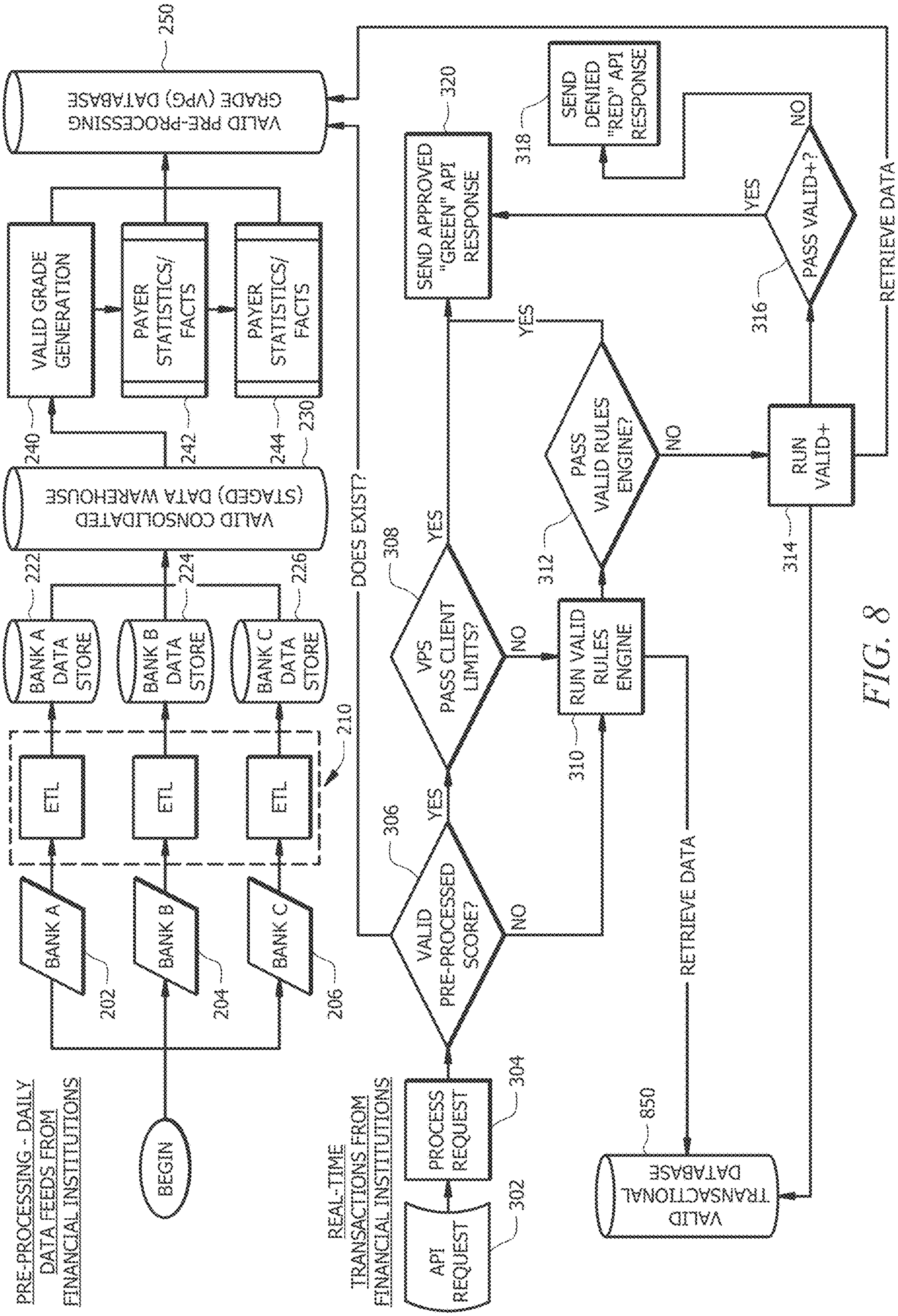
FIG. 8 is flow diagram of methods performed by an embodiment of the presently disclosed accelerated funding evaluation system, including real-time transaction processing and analysis of pre-processing data.

If, on the other hand, at step 308 it is determined that based on the previously derived grade for this customer and the parameters of the pending transaction that the request does not fall into the range considered acceptable for accelerated funding, the process moves to step 310 where IFES analyzes the information available according to its rules engine. The rules engine performs what may be considered a second layer of analysis beyond the initial consideration of whether the transaction parameters fall within an acceptable range according to the grade score. FIG. 8 depicts the interaction between the real-time immediate funding approval process of transactions received at a financial institution (FIG. 3) and the pre-preprocessing grading system performed by the preprocessing components and operation of the IFES system (FIG. 2).

The analysis performed by the IFES (or VALID) Rules engine at step 310 in FIG. 3 is based on data retrieved by a transactional database (850) associated with a particular financial institution. The IFES Rules engine includes rules and parameters that evaluate the risk of the pending transaction beyond the grade assigned by the IFES grade generator during pre-processing operations. If at the conclusion of the rules engine analysis at step 312 the transaction is deemed acceptable according to the parameters of the rules engine, the process proceeds to step 320 with IFES sending a "green" or approval notification to the bank authorizing the transaction for accelerated funding. As a result, on the bank side the funds will either made immediately available for deposit in the customer's account and the account credited or the item will be cashed. On the other hand, if the transaction is not approved following the rules engine analysis of step 312, the process continues at step 314 where an IFES+ (or VALID+) analysis is performed. This VALID+ analysis is another layer of analysis as described above in which rules are applied to provide a more granular determination of the level of risk associated with the transaction as was previously determined by the preprocessing grading process and the rules engine.

As shown in FIG. 8, a VALID+ Rules Analysis is performed in which data is retrieved from the preprocessing grade database 250 and a Transactional Database (850) and analyzed according to a set of risk evaluating rules. Decisioning creates and adapts to a customer's behavior, evaluating the unique characteristics of each transaction. Every transaction "fingerprint" is evaluated in real-time against historical performance, data sources and automated algorithms. The model is consistently learning through daily feedback loops of returned items, data point interactions and prior transaction review for both the customer and the payer.

If at step 316 it is determined that the transaction is approved following the analysis by the VALID+engine, then the process proceeds to step 320 with IFES sending a "green" or approval notification to the bank authorizing the transaction for accelerated funding. As a result, on the bank side the funds will either made immediately available for deposit in the customer's account and the account credited or the item will be cashed.

If, on the other hand, the result of the VALID+ determination at step 316 is that the transaction did not pass, then a "red" declined message is transmitted to the bank at step 318. In such circumstances, the transaction is not eligible for accelerated funding of the item. The customer may, however, submit to item for typical non-accelerated processing according to customary bank policy.

As discussed, among the data included in data stores 222, 224 and 226 of FIG. 2 is All Items data, All Returns data and Depositor Information. As such, the data store for a particular bank, following the ETL process, makes data in these three categories available to the various IFES rules engines described above for analysis. Within these data stores are collected items from individual transactions as well has the end of the day status of a customer's account and returned items. Specifically, a data store 222, 224, and 226 would include the date of the transaction at issue, the routing and account number of the item, the transacting account number and the check number and amount for the item. Similarly, the data store includes All Returns File items reflecting incoming and outgoing returned items, including the date of the return, the routing and account numbers of the item, the transacting account number, the check number and amount of the check, and a return reason code signifying the reason that the item was returned.

Data store 222, 224, and 226 also includes Depositor Information Files. The data stored in these DIF files could relate to active deposit account holders of a financial institution, including the account number, account type, the account open date, the relationship date, current account balance, average daily account balance, total relationship balance, and institution product code. These items stored in the data store are leveraged to determine in real time the risk associated with the institution immediately making funds available to a customer, in particular with respect to customers transacting bank business via a mobile device or remote ATM terminal.

Figure 4:
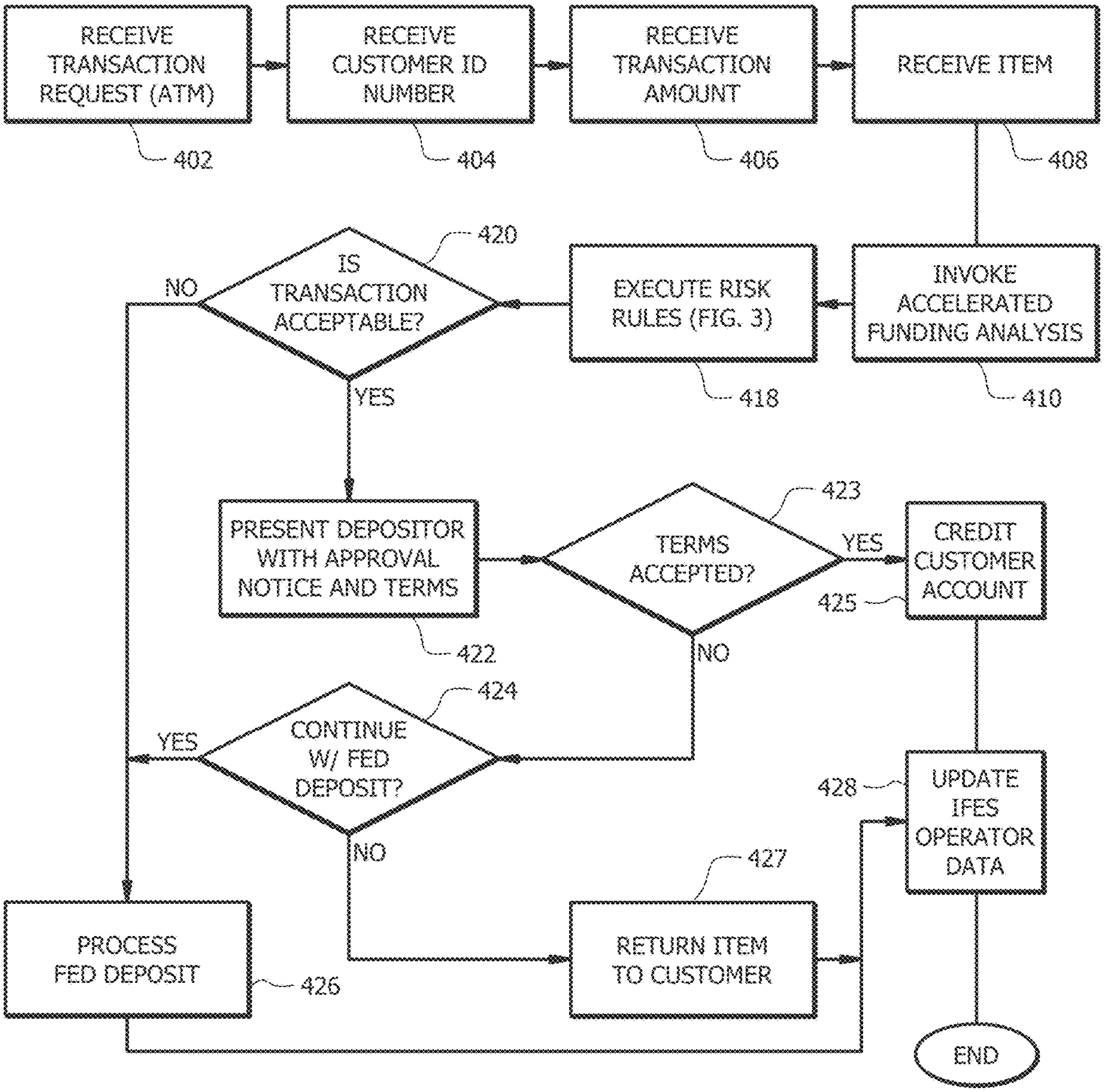
FIG. 4 is flow diagram of methods performed by an embodiment of the presently disclosed accelerated funding evaluation system in connection with a bank transaction performed via an automatic teller machine.

FIG. 4 is a flow diagram depicting an embodiment of the instant funding evaluation system of the present disclosure. In this embodiment, a bank customer presents an item for funding to the bank through an ATM terminal. The process of instant funding evaluation begins at step 402 where the IFES receives a request that a customer via an ATM terminal is seeking immediate funding of an item. In the process of receiving the request, the bank's customer identification functionality will confirm the identity of the customer through a variety of means. Typically, the customer will be provided with a unique account number corresponding to the customer's deposit account. Other identity confirmation capability may be employed, such as receipt of biometric data that uniquely identifies the bank customer with real time receipt of a biometric attribute (fingerprint, voice signature, etc.) compared to a corresponding biometric sample of the customer stored in a dedicated data store of the bank along with other customer account information. By example, such identification confirmation data may be stored in the Depositor Information File.

Once a transaction request is received, the IFES will receive this customer identification number or indicia at step 404. Once the customer is indeed confirmed as having a record of an account with the institution, the process continues with step 406, where the transaction amount at issue is received. In the typical scenario, the transaction amount is the amount payable to the payee of a check. In the ATM paradigm, the customer will deposit the check via a dedicated interface unit on the ATM terminal. In one embodiment, the check may be fed into a slot that in parallel with receipt of the check captures an image of the check. With the capture of the image the MICR number, amount, is gleaned from the check. Through this process, at step 408 the banking platform receives the item, either in hard copy, by image or both.

Once the customer's identification is confirmed and other pertinent details of the item are collected by the customer, the IFES evaluation process is invoked at step 410. While IFES capability may reside within a central processing system (as generally depicted in FIG. 1) that provides risk analysis associated with accelerated funding of presented bank items for one or more banks, the functions performed IFES may be performed entirely by an internal system at a single bank or may be distributed across multiple internal systems at multiple associated or unassociated banks. Upon collection of the various data associated with this transaction, the various data files associated with the customer are updated.

Continuing with FIG. 4, once IFES is invoked and the pertinent data files for this transaction and customer have been updated, the process moves to step 418 in which the IFES risk rules are executed. Risk rule execution is described in detail with respect to FIG. 3. These rules take into account the various information stored in relevant files discussed above and stored in data stores 222, 224 and 226. The risk rules may generally apply to all participating banks or may be tailored according to the risk tolerance of a particular bank. By example, one member bank may place higher significance on the duration of the relationship the payor or payee has maintained with the bank and less on the average daily account balance of one or both. Alternatively, another bank may place more significance on the amount of the transaction at issue and less on the number of items of the payor drawn on the account during a particular period. The advantage of the IFES rules engine is that it is customizable to accommodate the risk tolerance and practical business parameters of the member banks. The rules are not static and no particular set of rules must be applied wholesale to multiple banks and no single set of rules must apply at all times to customers of a single bank. In one embodiment, a bank may apply more stringent parameters for items presented during certain seasons, such as the holiday season when items may be more likely return for insufficient funds. Regardless of the objectives of a single bank or multiple banks, the IFES rules engine offers dynamic evaluation of an item for accelerated funding.

Continuing, once the rules engine is run with respect to a particular item, IFES determines at step 420 if the transaction is acceptable for accelerated funding. As discussed, the answer to this query determines a multiple stage process involving application of various sets of IFES risk rules that offer various levels of transaction evaluation. The initial analysis of the transaction entails retrieval of a previously processed grade pertaining to the presenting customer. This grade is stored in the preprocessing grade database 250 and is derived typically from historical customer data. The grade, in one embodiment, may represents a factor applied to an amount of a subsequent item presented for deposit by a customer. In the event that the transaction is not approved by virtue of the preprocessed grade afforded a particular customer, additional and more granular IFES rule sets may be applied to the transaction. These rule sets may provide different weighting of various data points associated with the transaction and may take more into account attributes of the particular item and less of the historical data associated with the customer. By example, accelerated funding of a check drawn on the account of another bank customer carrying a high average daily account balance and having a long-standing relationship with bank (i.e., an on-us item) would likely be assigned less risk than that determined via the preprocessing grading system. Accordingly, this second layer of analysis may result in approval for accelerated funding.

If, however, following application of the IFES risk rule set the transaction remains unapproved for accelerated funding, a third set of risk rules that may be characterized as "plus" or "+" rules may be applied. These rules take into account additional variables and provide a heightened level of scrutiny as compared to the preprocessing grade range comparison and first layer of risk rules applied to the transaction. The "plus" rules may take into account, for example, the identity of the payor institution alone. For example, if the item for deposit is an individual's federal income tax refund drawn on the account of the United States Department of the Treasury, the item likely has little to no associated risk regardless of the account status of the customer. Thus, while this particular transaction may at a high level entail a very large item presented for deposit by a new bank customer having a relatively low daily balance with perhaps one or more items that have been return items, by virtue of the identity of the payer alone, the item may qualify for accelerated funding. Accordingly, the various layers of rules operate much like a filter providing more and more refined evaluation of a particular transaction.

If the amount of the item is factored by an appropriate amount according to the various rule sets and the result falls within an acceptable range, then the answer at step 420 is yes and the method proceeds to step 422. At step 422, the customer via the ATM terminal's interface is presented with a notification that the item has been approved for accelerated availability and the terms associated with making the item so available. This notification is significant because a bank may charge a fee for the accelerated availability of funds and the user may not wish to pay a fee or have a need for accelerated fund availability. Other terms associated with the transaction may apply. Moreover, state and/or federal regulations require that fees associated with such banking services be provided to the customer in advance of charging the fee. Thus, once the customer is notified that the transaction was approved for accelerated funding and any fees associated with the transaction, the process continues at step 423 where the customer either accepts or declines accelerated funding. If the answer to this query is yes, then at step 425 the customer's deposit account is credited by an appropriate amount. At step 428, IFES operator data is updated accordingly.

If, at step 420, the answer is no as IFES determined that the item does not qualify for accelerated funding, then the process moves to step 421 in which the item is deposited and processed according to customary bank policy (i.e., Federal Reserve deposit) and the process proceeds to step 426 where the customary or "Fed" deposit is executed. Next the process continues to step 428 where the IFES operator data is updated accordingly.

Returning to query 423, if the transaction is approved for immediate funding but the customer declines the terms of the same, then the process proceeds to step 424 where the customer is queried for approval to continue with "Fed" or customary deposit processing. If the answer to this query is yes, then the process continues at step 426 as described above and the Federal Reserve deposit is executed. Finally, the process concludes at step 428 with the updating of IFES operator data. On the other hand, if the customer declines the customary Federal Reserve deposit at query 424, then the process skips to step 427 and the item is returned to the customer. The process concludes with step 428 with the IFES operator data updated accordingly.

The various embodiments of the accelerated funding evaluation system described herein are described in the context of performing the analysis on items presented by current financial institution customers. That is, customers having accounts with a particular institution. The systems and methods described herein, however, may be modified to evaluate items presented by those who are not bank customers. In such circumstances, the systems and methods described could be modified to include methods and systems to verify the identity of a presenting party via data residing in external verification data stores operated by third parties. These identity data stores and associated identity confirmation functionality may be used to validate the identity of a non-customer when the non-customer presents an item for cash. The identity verification capability may include, but are not limited to, name, social security or other identification number, most recent five addresses, date of birth, driver's license number, sex, height, weight, eye color, hair color, phone number, whether the person is deceased, and aliases. The identity verification data is typically indexed by social security number and/or name. A third party identity system may leverage biometric data (e.g., images of fingerprints). The third party identity verification provider may provide identity verification data not otherwise available to the public. For non-customers wishing to present an item for cash, once the individual's identity is confirmed, some of the IFES rule sets described may be applied to a particular item and in some circumstances the bank may elect to honor the item.

Figure 5:
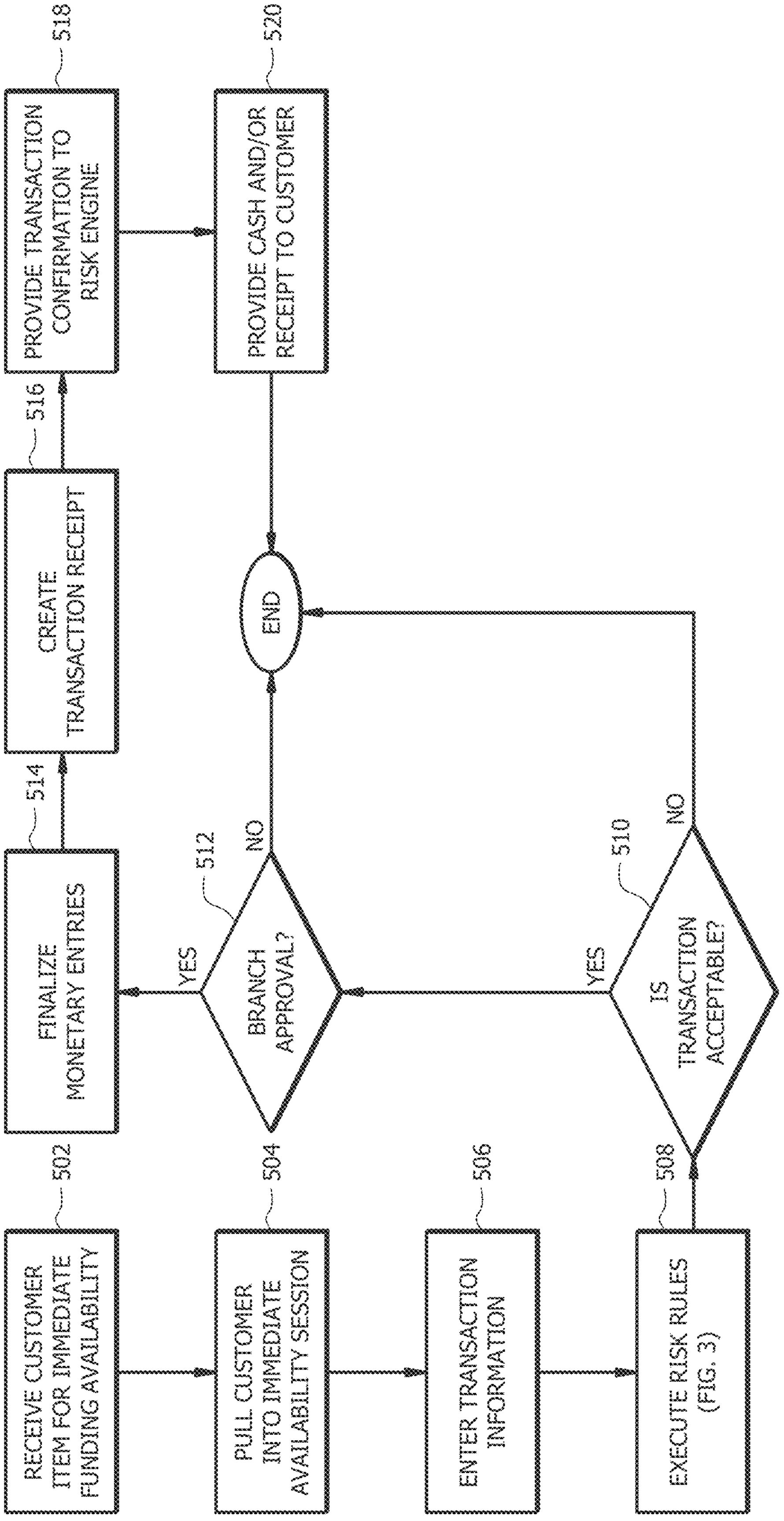
FIG. 5 is flow diagram of methods performed by an embodiment of the presently disclosed accelerated funding evaluation system in connection with a branch transaction at a teller terminal.

FIG. 5 is a flow diagram depicting the operations performed by the presently described IFES in the context of a bank customer presenting an item to the bank for cashing to a teller at a branch according to an embodiment of the present IFES. The method of the present IFES depicted in FIG. 5 begins with step 502 with the receipt of a customer item for immediate or instant finding availability. The method continues with step 504 where the bank via the teller pulls the customer into or invokes an immediate funds availability session. Next, at step 506 the customer's transaction information is entered for analysis by the IFES. Then, at step 508 the IFES executes the risk rules that are provided in detail and described in connection with FIG. 3. Once the risk rules are executed, the IFES queries at step 510 whether the transaction or item is acceptable or immediate funding by the bank. If the answer to the question is "no", the process ends. If, the answer is "yes" to query 510, then the system queries further at step 512 whether specific and additional branch approval has been obtained. If the answer to this query is "no", then the process ends.

If, however, the answer at step 512 is "yes", then the process continues with step 514 with the system finalizing monetary entries. This includes action taken on the account to make the funds available immediately, such as lifting a hold placed on a check and changing the status of a check as immediately available. Next, the method proceeds to step 516 where a transaction receipt is created. This receipt serves as evidence of the customer transaction and may be in paper or electronic form, or both. Next, the process continues with step 518 where a transaction confirmation message is sent to the risk engine. This confirmation message allows the risk engine to take the successful completion of the accelerated transaction into account when weighing the risk of future transactions. Finally, the process ends at step 520 where the customer is provided with the net cash proceeds from the transaction and/or a receipt. Note that the subject transaction in this branch bank example may flow from a customer simply presenting a check for cashing or depositing a check and requesting some portion of the payable amount in cash as the time of deposit.

Figure 6:
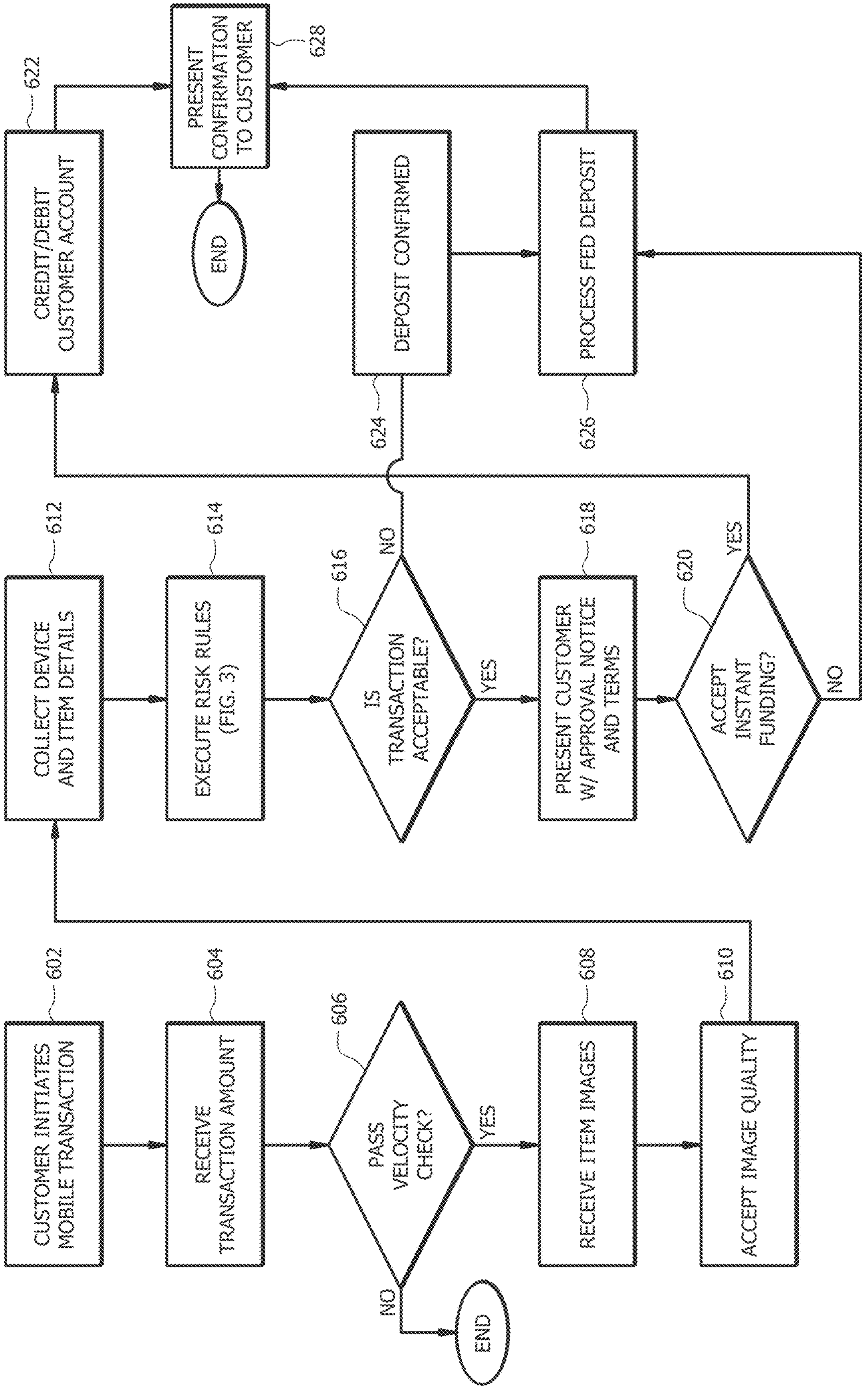
FIG. 6 is flow diagram of methods performed by an embodiment of the presently disclosed accelerated funding evaluation system in connection with a branch transaction performed via a mobile device.

FIG. 6 is a flow diagram depicting the operations performed by the presently described IFES in the context of a transaction initiated by a bank customer through a mobile device enabled by a mobile application allowing the user to conduct bank transactions according to an embodiment of the present IFES. The process begins at step 602 where the banking platform receives indication that a customer has initiated a mobile banking transaction. In this example, the customer presents a check for deposit. At step 604, the method continues with the banking platform receiving a transaction amount for the subject transaction. At step 606, the banking platform queries whether the transaction is within any limit placed on the customer account in terms of a maximum amount of deposit a customer may make in a business day. This may be referred to as a "velocity check". If the answer to this query is "no", the process ends and no transaction is consummated.

If the answer at query 606 is "yes", however, the method proceeds to step 608 where the platform receives image data of the item presented by the customer. This image data received would include an image of the front and back of the check. At step 610, the platform accepts the image as a quality image and at step 612 the platform collects details about the mobile device initiating the transaction and further details about the item presented for deposit. The mobile device detail data is used among other things to confirm the authenticity of the depositor and customer mobile device executing the transaction as the customer's device is uniquely identified as belonging to that customer and in turn the customer's account. Next, at step 614, the system executes the risk rules as described in detail in connection with FIG. 3.

Following execution of the risk rules, the system queries at step 616 whether the transaction is approved for immediate or instant funding. If the answer to this query is "no", then the process skips to step 624 where the deposit is confirmed. The method then continues to step 626 where the deposit it processed according to ordinary bank procedures and is carried out as a typical Federal Reserve deposit. Then, the method proceeds to step 628 where a confirmation message is sent to the customer via the customer's mobile device.

If, however, the answer to the query at step 616 is "yes", then at step 618 the customer via the mobile device is presented with an approval notice for immediate funding and any terms and conditions associated with immediate funding. At step 620 the system queries whether the customer has accepted the instant funding option (and any associated terms). If the answer to this query is "no", then the process skips to step 626 in which the deposit is processed as a standard Federal Reserve deposit. Then at step 628 a confirmation message is sent to the customer via the customer's mobile device.

If, however, the answer at step 620 is "yes" and the customer accepts instant funding, then the process continues to step 622 where the customer account is credited and debited according to the parameters of the approved transaction. Next, the process continues to step 628 where a confirmation message is sent to the customer via the customer's mobile device. With step 628, the process ends.

Figure 7:
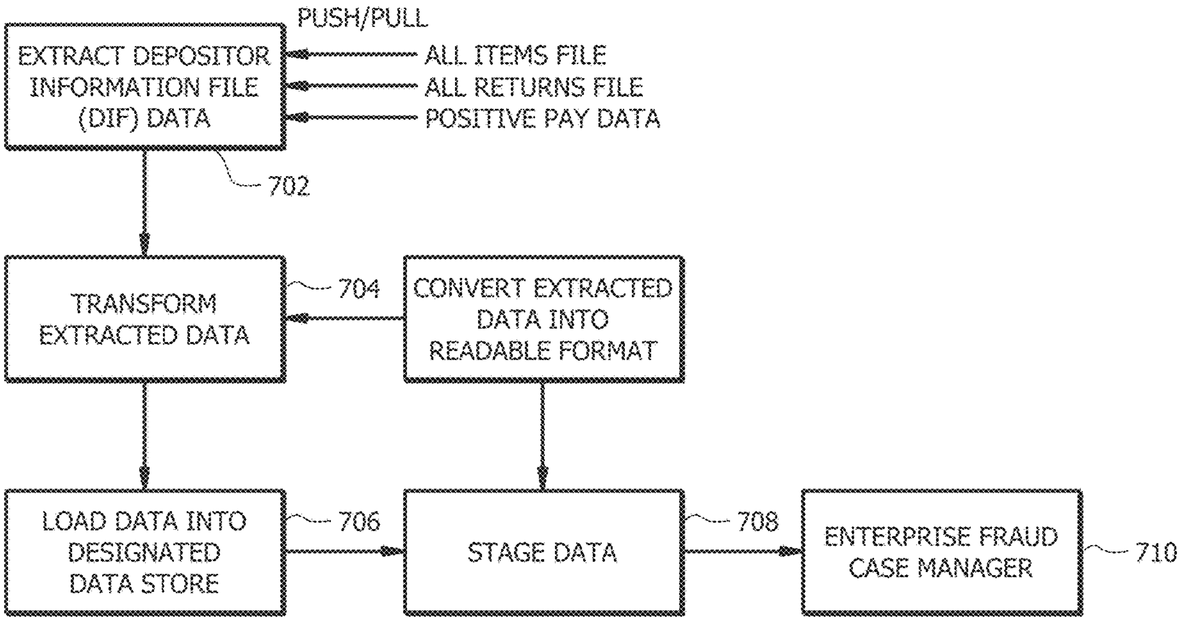
FIG. 7 is flow diagram of methods performed by an embodiment of the presently disclosed accelerated funding evaluation system associated with transaction data extraction, processing and storage.

FIG. 7 is a diagram providing additional description of the operational components and flow diagram provided in FIG. 2, which describes the flow of information from the participating financial institution to the IFES pre-processing data store. In FIG. 7, data is extracted at step 702 from a depositor information file containing various depositor related data as described above.

This data is processed in batches may be extracted via push or pull capability or by other means. Data extracted includes data from All Items files, All Returns files or optionally positive pay files. Positive pay files contain information of expected deposited items that are generally pre-approved for funding. Such items include payroll checks and insurance related checks. These checks are typically of a known amount in advance of deposit and the check number and amount are pre-identified to the bank in anticipation of the deposit process. Once extracted, the extracted data is transformed at step 704, that is, converted into a readable format to accommodate the language employed by the particular IFES data warehouse. Once the data is loaded at step 706 in the appropriate data store, the data is staged at step 708 in the IFES consolidated data warehouse. At step 710, at the request of a participating bank, the IFES may send decision information to the bank fraud detection case manager or other personnel to better evaluate internal processes of risk evaluation.

Until recently, the value of a presented financial item could truly only be "unlocked" through deposit into the presenter's financial institution account or cashing the item. As described in detail above, this results in delays in terms of when those funds would be made available for use. The embodiments of the instant funding evaluation system described herein are equally applicable to other financial innovations and other forms of transaction accounts that have emerged outside of traditional bank checking and debit and credit accounts. Stored value accounts including prepaid cards, mobile or digital wallets, digital currency exchanges and other such accounts invoke the need for accelerated funds availability for those making transactions through these new types of accounts.

In lieu of an individual presenting a check to a financial institution or check casher for cashing, a check could be provided to a financial services company offering a form of a stored value. Using methods of the IFES (VALID) rules engine described above with respect to FIGS. 3 and 8 the item presented by the customer would be evaluated for risk. Upon acceptance of the item, the check could be converted to the equivalent stored value. By utilizing the risk systems evaluation methods and systems described herein, funds could be made available without delay.

An example would be a digital currency exchange. A digital currency exchange may accept checks from users via an application executed through a mobile user interface such as a smart phone. Through such a mobile application, a user may fund her digital currency account. For this mobile user, a $500 item deposited would be processed and evaluated according to the methods described above and a risk determination is made on the item. If approved, the customer then immediately receives $500 of equivalent digital currency as stored value in the associated account.

Dynamic Fraud Alert System. In another embodiment of the present Instant Funding Evaluation System, a fraud alert system and method that notifies personnel at a point of deposit or at another depository bank of fraud associated with an item presented for deposit or an individual presenting the item.

The challenges related to fraud recognition are ever-changing. Banks have a diminished capability to react to current and new fraud trends in a timely manner. To combat these issues, the presently described fraud alert system provides a two-fold system that 1) identifies existing and new fraud behavior patterns and 2) communicates detailed alert messaging to the bank's fraud team(s)/systems(s). Check issuer (payer) data statistics and pattern algorithms are leveraged across multiple bank networks.

New fraud behavior is detected through learned behavior pattern algorithm detection, based on Bayesian principals of probability, as well as applying heterogeneous outside variables against certain knowns. These behavior algorithms allow for continual detection of new fraud behavior.

To allow large, mid-size and smaller banks to take advantage of this technology, the present fraud alert system includes various options related to fraud alert communication protocols to provide a customizable system to individual banks.

The present fraud alert system may operate according to three paradigms. First, the IFES described above can be leveraged to receive sub-second fraud alert responses that can be directed to the Banks Fraud system application(s) to allow for real-time account deposit item holds. Upon receipt of the alert the Bank can then select which fraud alerts will be integrated for immediate deposit item holds, or are to be reviewed by bank fraud representatives.

Second, IFES can be leveraged to send a predefined number of intra-day fraud alert notification files. The alert files can be integrated into the bank's fraud system application(s) for near real-time account deposit item holds, or the alerts can be reviewed manually by bank fraud representatives, or a combination of both.

Third, the presently described fraud alert system can operate to provide a single fraud alert batch file each bank cycle day. The batch file can be integrated into the bank's fraud system application(s) for daily account deposit item holds, or the alerts can be reviewed manually by bank fraud representatives, or a combination of the two.

The core ability of the presently described fraud alert system to manage against real-time fraud is provided through data interrogation and continual stream message queues against the data. Data received from daily batch bank files, along with IFES transaction data feeds are continually processed through Behavioral Data Tag/Data Dimension algorithms, which allow for efficient data querying along with behavioral pattern identification.

Behavioral Data Tag/Data Dimension algorithms can also be executed against large, historical batch bank files, upon loading the historical bank data in a fraud identification relational database.

Behavioral Data Tag/Data Dimensions (TAGS) work both independently and in combination with other TAGS in order to refine probability data of an Account Holder's or Check Issuer's ensuing action. TAGS are applied at the transaction line item data level, allowing for behavioral review at the time of the transaction and comparing this behavior across the Account Holder and Check Issuer behavior timeline. In Table 1 below, various API data components and sample TAGS are shown. API data components include a transaction date, a transaction channel, an account holder identification number, which uniquely identifies the account holder within the bank institution, the check issuer's identification number and the transaction amount. TAGS that may be applied include a weekly savings amount for the account holder, a RUN7 count and a returned item count. The "RUN7 Count" column in Table 1 refers to the total sum count of transactions on the given TRXN Date for the particular Account HolderID. In one embodiment, the RUN7 count can refer to the number of transactions processed for an account holder on a transaction date. For example, in TABLE 1 below Account HolderID 55116 made two transactions on Apr. 1, 2017. The system can also tally the transaction count for a longer period as well, such as a week, month or year as an additional metric in identifying fraud. For example, if the RUN7 total is measured over one month and an account holder had a count of four on April 1st and a count of one on April 20th—that account holder's RUN7 count for that month would be five transactions.

The behavior of the individual Account Holder and/or Check Issuer following placement on the CF data table determines the real-time, automated action steps to be taken. Actions could result in single or multiple systematic responses, such as placement on a negative history table, positive removal from CF data table placement, subsequent CF data table placement for new and/or additional behavior pattern review, transaction product decline(s) and real-time fraud alert notification Real-time fraud alert notification. The present fraud alert system returns real-time fraud alert (RTFA) notifications directly to client bank's fraud identification system. The bank's risk/fraud teams also have the option of reviewing RTFA notifications via a dedicated insights and reporting portal.

RTFA notifications have three primary trigger mechanisms: (1) CF Review activity; (2) negative risk model activity; and (3) active fraud file activity. Fraud notifications are submitted by the RTFA system to a dedicated API and the dedicated insights and reporting portal, in the event of a single or multiple account holder or check issuer's trigger event.

A default set of RTFA messages are used by bank systems or bank risk/fraud teams that explain the suspected fraud Account Holder and/or Check Issuer activity and recommended actions for the bank. The RTFA messaging system can also create bank specific alert notifications that better meet bank-specific process needs.

TABLE 1

| API Data Components | | | | | TAGS | | |
|---|---|---|---|---|---|---|---|
| TRXN Date | TRXN Channel | Account HolderID | Check IssuerID | TRXN Amount | Wkly SAVING | RUN7 Count | RTRN Count |
| Apr. 1, 2017 | 3 | 55116 | 943 | 792.33 | 631.52 | 2 | 0 |
| Mar. 28, 2017 | 2 | 55216 | 941 | 438.45 | 421.55 | 1 | 0 |
| Mar. 28, 2017 | 2 | 67815 | 724 | 671.48 | 594.48 | 1 | 0 |
| Mar. 15, 2017 | 3 | 44857 | 155 | 1157.45 | 1112.95 | 1 | 2 |
| Mar. 12, 2017 | 1 | 84180 | 748 | 404.36 | 382.07 | 1 | 0 |

TAGS are available for direct data querying, for the purposes of analytics, reporting, risk modeling and Real-time Fraud Alert messaging. TAGS are also utilized at to design and build predictive text qualifiers. These behavioral qualifiers assist in allowing individual business teams, client or partners to have their own unique text definitions of an Account Holder or Check Issuer's behavior at the time of the transaction. An example of a behavioral text qualifier is the phrase "STALE ISSUER", meaning "a transaction has not been presented for the Check Issuer in greater than 'X' days".

These data (TAGS) are instrumental in allowing for the systematic processes of real-time Contingent Fraud (CF) review and real-time Fraud Alert Notification.

Real-time Fraud Alert Notification. Account Holders and Check Issuers that do not fall within STANDARD behavior, are placed on the Contingent Fraud (CF) data table. STANDARD behavior could be assessed by a single or combined number of CF algorithms. Examples might falling outside of standard deviation of prior behavior timeline, a new transaction pattern, or geographic transference activity.

Suspect transaction behavior is what identifies and places Account Holders and/or Check Issuers on the CF data table. At the time of placement on the CF data table, Account Holders and/or Check Issuers are not adversely affected by transaction decline or real-time Fraud Alert Notification. A real-time CF algorithm critiques and provides a confidence rank for the individual Account Holder and/or Check Issuer transaction activity following placement onto the CF data table.

Figure 9:
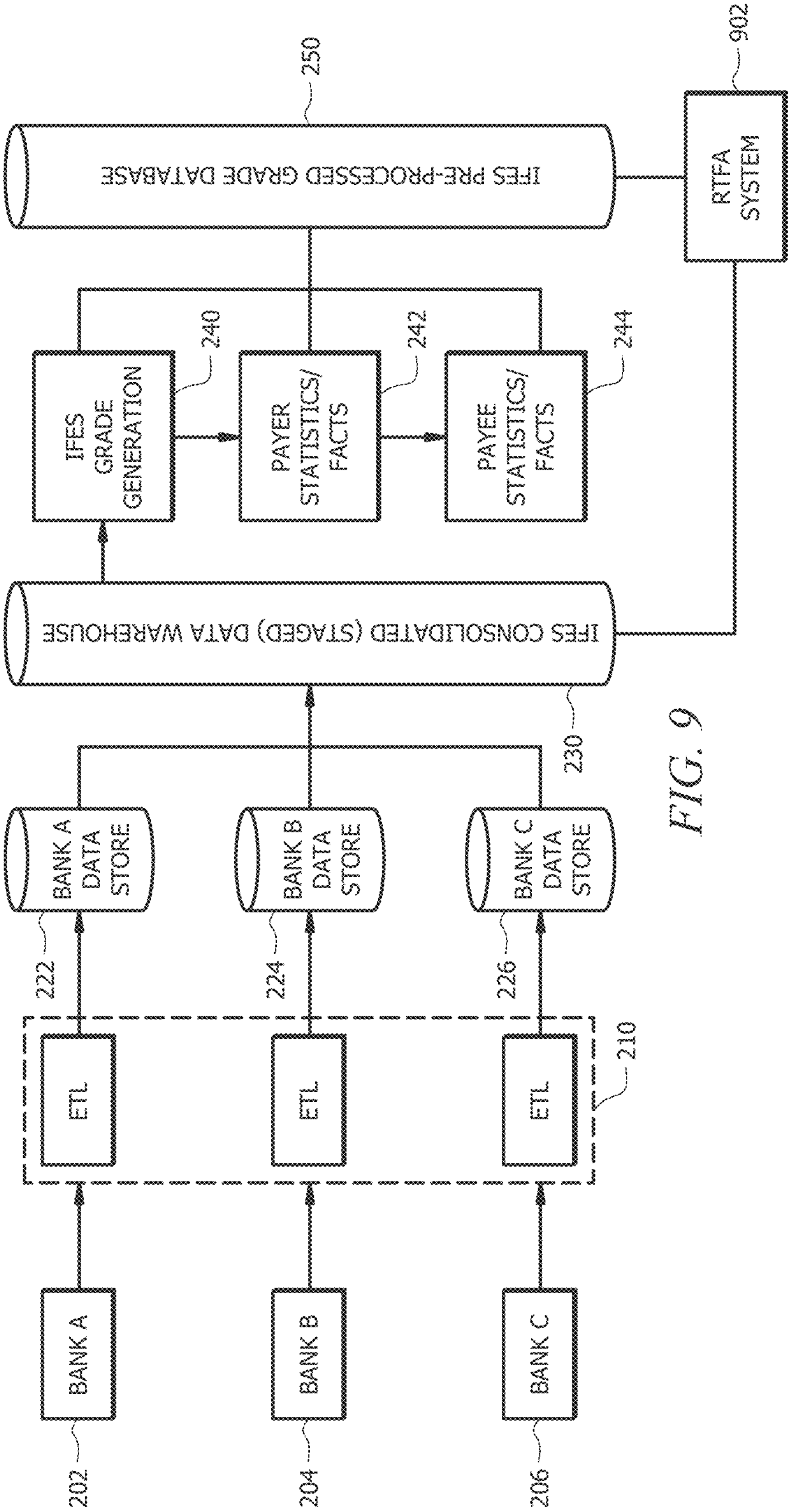
FIG. 9 is a diagram of a network architecture of an embodiment of the presently disclosed real time fraud alert system.

FIG. 9 depicts the components of an embodiment of the real-time fraud alert system In this embodiment, FIG. 9 is premised on the IFES architecture described above with respect to FIG. 2, with the RTFA system 902 hardware and software in communication with IFES consolidated data warehouse 230 and IFES pre-processed grade database 250. RTFA system 902 can receive data from data warehouse 230 and grade database 250. In addition, RTFA system 902 can receive directly from each bank 202, 204 or 206, either before or after the extract, transform and load (ETL) process at stage 210. The presently described RTFA system can be a module integrated within IFES 120 to function as a component of an IFES platform. In the alternative, the RTFA system can operate as a standalone system providing real time fraud alerts for banks that do not participate in IFES services.

Recall that receipt of relevant information from the various participating financial institutions that is used by IFES 120 to evaluate whether a presented item is worthy of accelerated funding. As seen in FIG. 9, various participating banks 202, 204 and 206 make prior or current day data available to IFES. This data is gathered by banks 202, 204 and 206 throughout the banking day and stored in data stores corresponding to banks 202, 204 and 206 in the various data stores 222, 224, and 226. This data can be made available to RTFA system 902.

As shown in FIG. 9, each day various transaction and customer account related items are made available to IFES. In one embodiment, data is retrieved from the individual banks through either a push or pull process. In the example, three participating banks collect transaction and customer throughout the business day. Prior to storage in the corresponding data store for each bank, this data for each then undergoes an Extract, Transform and Load (ETL) process at stage 210, as described above. Via the ETL process, pertinent banking data necessary for ultimate effective use by IFES is extracted from the daily or otherwise periodically collected data. This data is then transformed or converted into data readable by the IFES system. Once the data is so converted, the converted data is loaded in the associated bank data stores 222, 224 and 226 as previously described. These data stores contain what may be characterized as All Items data, All Returns data and Depositor Information data. This data stored in bank associated data stores may be extracted, transformed and loaded in virtually real time throughout the banking day, or may undergo the ETL process at regularly scheduled intervals, or at the end of the business day. This enables the RTFA system to continually analyze fresh information in determining if an item presented invokes fraud concerns requiring immediate notification and action.

Figure 10:
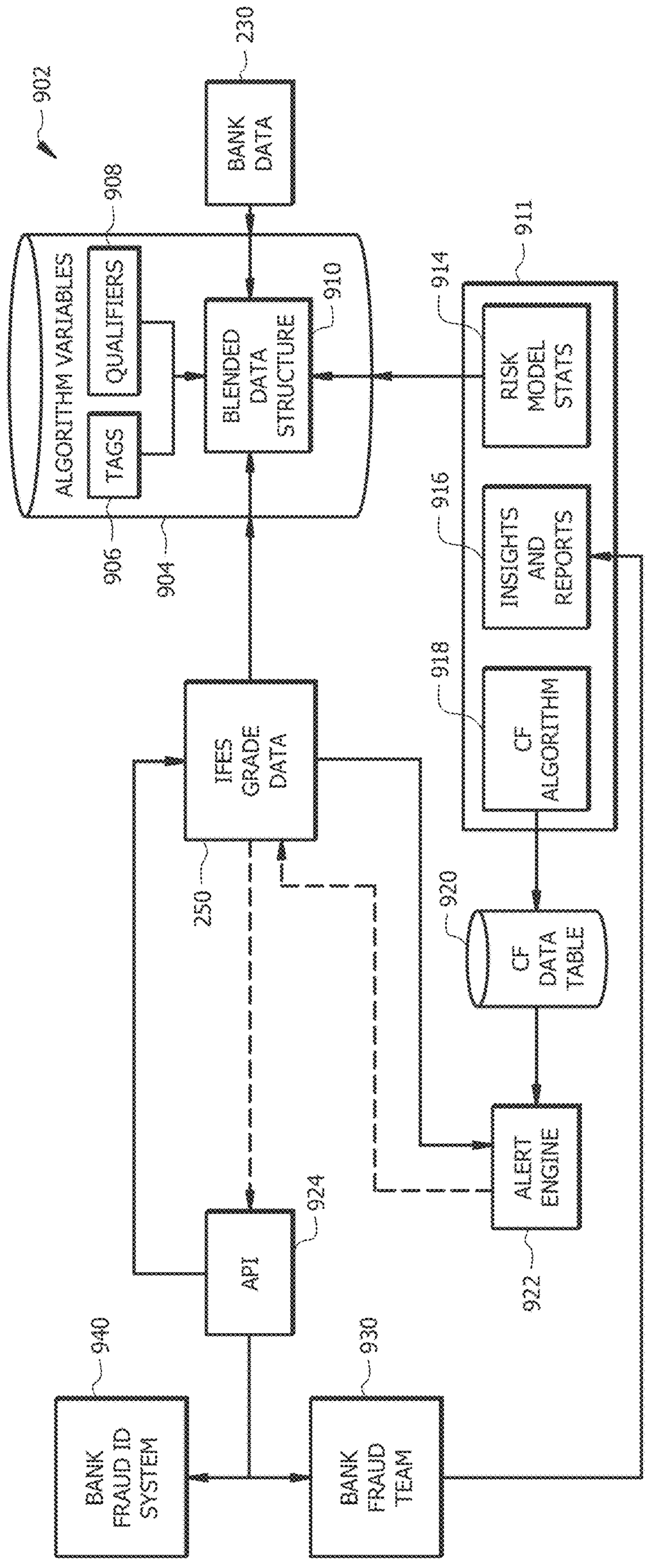
FIG. 10 is a diagram of a network architecture of an embodiment of the presently disclosed real time fraud alert system.

FIG. 10 is a diagram of the various components of the present RTFA system. RTFA system 902 includes RTFA database 904 in which are stored algorithm variables leveraged by the system. RTFA database 904 receives bank data from IFES consolidated data warehouse 230 and IFES grade data 250. RTFA database 904 may also receive data from individual banks 202, 204 or 206 whether before or after the ETL process at stage 210, as shown in FIG. 9.

RTFA database 904 includes blended data structures 910 comprised of TAGS 906 and qualifiers 908. RTFA database 904 may be queried through query interface 911 for addition of algorithm variables to RTFA database 904 reflecting risk model statistics 914. Bank fraud team personnel 930 or bank fraud identification system 940 can query RTFA database 904 via insights and reports portal 916 for real time analysis of fraud related data. Contingency Fraud (CF) algorithm 918 processes RTFA database data that is continuously updated to determine if an account holder or check issuer (payer) should be placed on the CF data table 920, or if subsequent action regarding a holder or payer that has been placed on the CF table is required. Once an individual account holder or payer has been placed on the CF table, the RTFA system algorithms continually analyze and perform confidence rankings of those individuals to determine what additional steps are required. Individuals placed on the table are not at that time adversely affected by a transaction decline or actual RTFA notification. Once an individual attains this contingency status, that status invokes further behavioral analysis that will result in either placement of the account holder or payer in the RTFA system negative history table, positive removal of the holder or payer from the CF table, later CF table placement for new or further behavior pattern review, transaction decline(s) or actual real-time fraud alert notification. CF algorithms 918 perform these pre- and post-CF table placement analyses and if an actual fraud alert is necessary, it is generated at alert engine 922 and communicated to fraud alert API 924 and to the bank fraud team 930 and/or bank fraud identification system 940, while in parallel RTFA database 904 is updated with this holder's or payer's status, accordingly.

Real time fraud alert notifications generated by alert engine 922 can be sent directly to bank fraud team members 930 and band fraud identification system 940 by API 924. Bank fraud team members 930 and bank fraud identification system 940 can also review real time fraud alert information through the insights and reports portal 916. Fraud alert notifications are triggered primarily by CF review activity, negative risk model activity and active fraud file activity. The present real-time fraud alert system operates as a feedback loop in which algorithm variable are continuously updated based on data interrogation and continual stream message queues against the data. Data within RTFA database 904 is continually updated by data received from daily batch bank files and API transaction data feeds.

As discussed above, behavioral data tags/data dimensions (TAGS) work independently and in combination with other TAGS in order to refine probability statistics concerning an account holder or check issuer's future action. TAGS are applied at the transaction line item data level, allowing for behavioral review at the time of the transaction and comparing this behavior across the account holder's and check issuer's behavior timeline.

Figure 11:
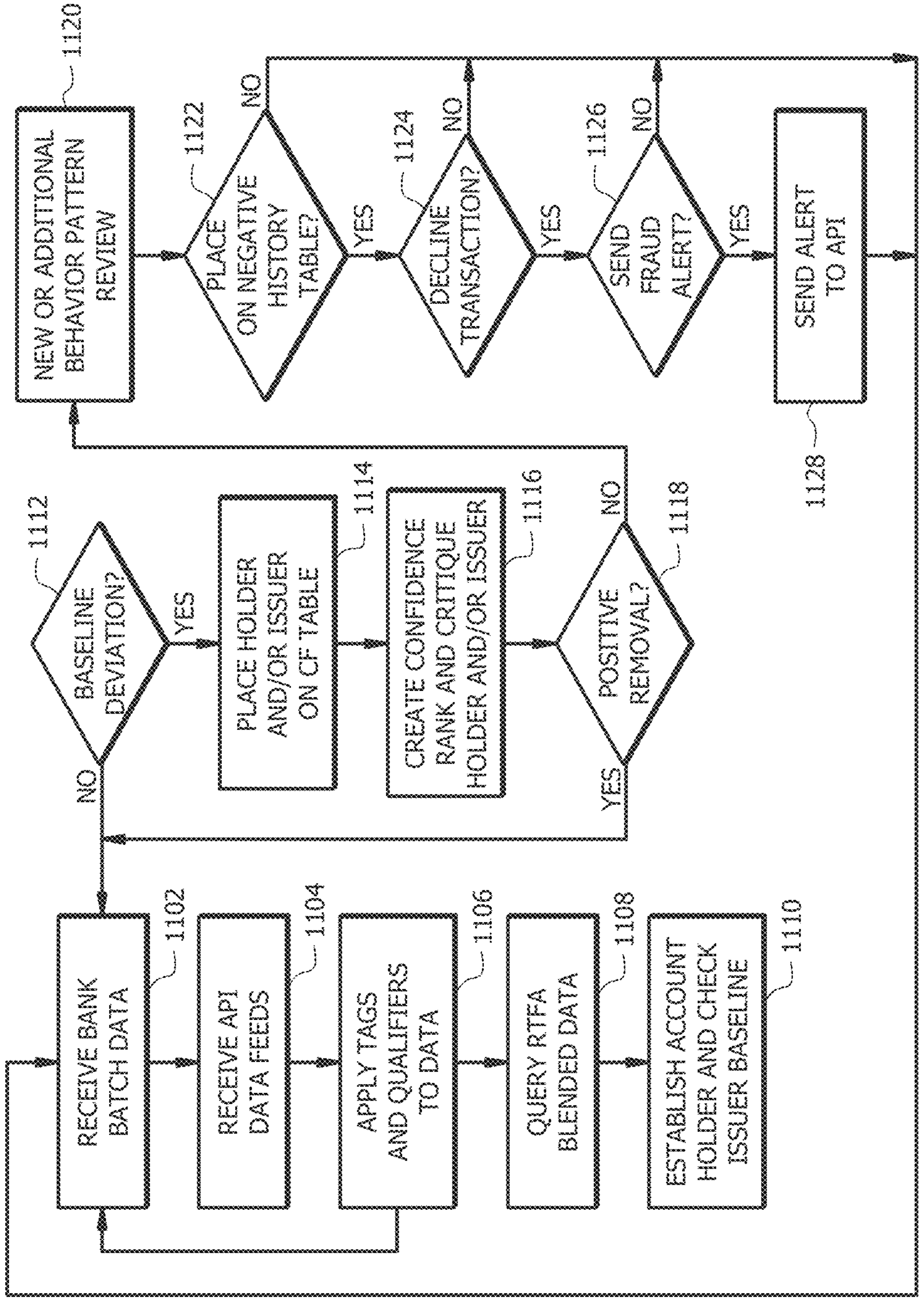
FIG. 11 is a flow diagram of a method of an embodiment of the presently disclosed real time fraud alert system.

FIG. 11 is a flow diagram of a method of an embodiment of the present real time fraud alert system. The method of FIG. 11 begins with step 1102 of the RTFA database receiving bank batch data, which may be periodically collected at known intervals. Next at step 1104 the RTFA database receives API transaction data feeds on a continuing basis as bank transactions occur. The data received at steps 1102 and 1104 is stored in RTFA database. Data received may include IFES grade data 250 (FIG. 9) and also IFES consolidated (staged) data stored in data warehouse 230 (FIG. 9). Thus, the real-time fraud detection and alerting capability described herein can be bottomed on analysis of specific bank data provided to the RTFA system in batches or on a transaction basis. Or, the RTFA system may leverage a combination of "new" bank data and processed IFES data. Integral to the real-time nature of the embodiments of the presently describe real-time fraud alert system is the real-time use of subject or contemporaneous account holder or check issuer transaction data to refine behavioral patterns used to detect fraud, while at the same time leveraging the refined behavior information to evaluate the subject transaction for fraud. This "feedback" loop operation provides fraud evaluation systems and individuals the most current and pertinent data to evaluate fraud risk, as opposed to other systems that run one step (or more) behind fraudulent actors.

TAGS and qualifiers are applied to the newly collected data at step 1106. This blended data structure residing in RTFA database 902 may be queried by bank users or systems according to TAGS and qualifiers applied and is so queried at step 1108.

The process of the RTFA system continues at step 1110 where a baseline or standard account holder or check issuer behavior is established. This baseline or standard is later used to compare to it actual account holder or check issuer activities to determine if contingency fraud measures must be taken. This comparison occurs at step 1112 where the system queries whether there is a deviation for a particular account holder or check issuer. A single transaction can trigger an alert or addition of the customer or check issuer to Contingent Fraud list. Velocity on count or amount can push a customer or check issuer over the line into a contingent fraud or alert status.

Alert Example. An example of an alert is now provided. Assume a holder of an account in question typically deposits amounts under $100. One banking day (April 1), however, the account holder presents a check for $7000 for deposit. Rules are established that no alerts are sent until certain attributes for the transaction or the account holder are established. With reference to TABLE 2 below, rules are set that no alert is sent for a deposit unless the deposit amount is greater than $1000 and the deposit amount is greater than the maximum cleared deposit amount for the account and the deposit amount is greater than 300 percent of the average deposit amount for that account. Again, the following rules pertain to triggering an alert:

Deposit Amount>$1000

AND Deposit Amount>Maximum Cleared Deposit Amount for Account

AND Deposit Amount>Average Deposit Amount×300%, then send alert.

TABLE 2

Account History

| Date | Deposit Amount | Average Deposit Amt. | Maximum Cleared Dep. | Alert Status |
|---|---|---|---|---|
| Jan. 1, 2017 | $100.00 | N/A | N/A | N |
| Feb. 1, 2017 | $50.00 | $100.00 | $100.00 | N |
| Mar. 1, 2017 | $40.00 | $75.00 | $100.00 | N |
| Apr. 1, 2017 | $7,000.00 | $63.33 | $100.00 | Y |

Table 2 provides an example of an account history of a bank account holder. On various dates, this account holder made deposits of $100.00, $50.00 and $40.00. According to the rules provided above for alert generation, none of these three deposits invoked an alert as each deposit was less than $1000.00. The fourth deposit of $7,000.00 for this account, however, made on Apr. 1, 2017 invoked an alert because all conditions of the alert rules were met. This deposit was over $1000.00. The deposit was greater than the previous Maximum Cleared Deposit and the deposit was more than 300 percent of the Average Deposit Amount. Accordingly, an alert was sent as denoted by a "Y" for yes in Table 2.

Continuing with the method depicted by the flow diagram of FIG. 11, if the answer to the query at step 1112 is "no" then the process reverts to step 1102 and continuous receipt of bank data via batch and API data feeds resumes. If, on the other hand, the answer to query 1112 is "yes", that there is a baseline deviation, then at step 1114 the account holder and/or check issuer are placed on the contingency fraud (CF) table.

Contingency Fraud Example. An example of transactions or account activity that can invoke account holder or check issuer placement on the contingency fraud table is now provided. Assume that a bank has established the following set of rules having conditions that if met results in the account holder or check issuer being placed on the CF table:

IF Deposit Amount>$100

AND Today's Prior Deposit Count>2

AND Today's Prior Deposit Amount>=$500

Then Block all deposits over $800 for 3 days

According to these rules, if the deposit amount is greater than $100.00, and the day of deposit's prior deposit count is greater than two, and today's prior deposit amount totals more than $500.00, then the account holder or check issuer is added to the CF list. Once on the list, the account holder and/or check issuer are monitored and any deposit exceeding $800 is blocked for three days.

Table 3 below provides an example of various account holder deposits that, according to the CF rules provided above, cause placement on the CF table and a deposit to be blocked. Assume a bank customer's account has multiple transactions on Apr. 1, 2017, which trigger the rule that adds this account to the CF table. If the account holder attempts to deposit a check over $800.00 over the next three days, the transaction will be declined. Transactions on the second day shown below and the first transaction on the third day are approved as usual, but the last $1000.00 transaction is declined because it breaks the final rule stated above.

TABLE 3

ACCOUNT HISTORY

| Date | Deposit Amount | Today Prior Deposit Count. | Today Prior Deposit Amount | Contingent Fraud |
|---|---|---|---|---|
| Jan. 1, 2017 | $200.00 | — | $— | |
| Feb. 1, 2017 | $150.00 | — | $— | |
| Mar. 1, 2017 | $350.00 | — | $— | |
| Apr. 1, 2017 | $100.00 | — | $— | |
| Apr. 1, 2017 | $300.00 | 1 | $100.00 | |
| Apr. 1, 2017 | $200.00 | 2 | $400.00 | |
| Apr. 1, 2017 | $700.00 | 3 | $600.00 | Added to CF Table |
| Apr. 2, 2017 | $700.00 | — | | Monitored |
| Apr. 3, 2017 | $700.00 | — | | Monitored |
| Apr. 3, 2017 | $1,000.00 | — | $700.00 | Blocked |

In the example provided in Table 3, the account under analysis had no days with multiple deposits until Apr. 1, 2017. On that day, there were four deposits made into the account. Once the fourth deposit of $600.00 was made, the account violated the rules above, i.e., that the deposit exceeded $100.00, there were more than two deposits in one day and total prior deposits for the day were at least $500.00. Once the rules were violated, the account is placed on the CF table. Under this example, any future deposit of $800.00 or more is blocked. Here, the deposits on Apr. 2, 2017 and Apr. 3, 2017 were less than $800.00 and simply monitored. On Apr. 4, 2017, however, the deposit exceeded $800.00, so the transaction was blocked.

Returning to the flow diagram of FIG. 11, the RTFA system's CF algorithm determines a confidence ranking and critique of the holder or issuer placed on the CF table at step 1116. Then, following these determinations subsequent action is determined. At step 1118 the process continues with the query of whether the ranking and critique are positive such that the holder or issuer can be removed from the CF table. If the answer is "yes", the method reverts back to step 1102 for receipt by RTFA system of more bank data.

If, on the other hand, the answer at step 1118 is "no", then the method continues at step 1120 with a review of the holder's and issuer's activity for new of additional behavior pattern review. Then, following this review, the method continues at step 1122 for the query of whether the issuer or holder should be placed on the negative history table. If the answer is "no", then the process reverts to step 1102 and receipt of bank data continues. If the answer at step 1122 is "yes", then at step 1124 the query is posed of whether the subject transaction should be declined. If the answer is "no", the once again the process reverts back to step 1102 for receipt of bank data. If, on the other hand, the answer at step 1124 is "yes", then the next query at step 1126 is posed of whether a fraud alert should be sent to the bank fraud identification system and/or bank fraud staff. If the answer is "yes", then the alert is sent at step 1128. If the answer is "no", the process again reverts to receipt and application of TAGS and qualifiers to newly received bank data, starting at step 1102.

Through the aforementioned systems and methods, real time fraud alerting is achieved through a continuous feedback loop of new transaction data processed and analyzed as it is received. The new bank transaction data in leveraged for repeated refinement of fraud identification variables, risk models and behavior pattern. Such constant refinement results in a dynamic system for fraud detection that allows bank fraud prevention teams and systems meaningful, available and live information in order to take fraud prevention measures once a real-time fraud alert is issued.

As generally illustrated herein, the system embodiments of the present disclosure can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. The present disclosure includes this type of computer readable media within its scope. The presently disclosed system anticipates a wide variety of variations in the basic theme of construction. The examples presented previously do not represent the entire scope of possible usages. They are meant to cite a few of the almost limitless possibilities. One skilled in the art will recognize that other embodiments are possible based on combinations of elements taught within the above description.

Although various embodiments of the present disclosure have been illustrated in the accompanying drawings and described in the foregoing Detailed Description, it will be understood that the present system is not limited to the embodiments disclosed, but is capable of numerous rearrangements, modifications, and substitutions without departing from the spirit of the system as set forth and defined herein.

The invention claimed is:

1. A method for determining whether to accelerate a transaction of a holder of a presented financial item, comprising:

storing extracted and converted data files following secure sockets layer ("SSL") encryption of personally identifiable information ("PII");

converting, from a first format to a readable format, account data and historical transaction data from a plurality of institutions, including personally identifiable information ("PII");

SSL encrypting the account data via a machine authentication code ("MAC");

wherein the SSL encrypted account data allows for optimized search and compare of the account data while encrypted;

storing the converted data from each institution of the plurality of institutions into a respective data store specifically designed for each of the plurality of institutions;

wherein configurable rules are associated with each of the plurality of institutions from the plurality of institutions;

importing a converted data from each of the data stores to result in a single cohesive architecture; and wherein the single cohesive architecture is configured to be accessed via an instant funding evaluation system ("IFES"); and wherein converting of the account data and the historical transaction data from the first format to the readable format, SSL encrypting the account data, storing the converted data, and importing the converted data occurs in real time throughout the banking day;

receiving by the IFES, via a network and from a mobile application stored in a mobile device associated with a user, a transaction request;

wherein the user is a holder of a first account at a first institution of the plurality of institutions;

wherein the user has first historical transaction data associated with the first account at the first institution; and wherein the transaction request comprises:

a transaction amount to be received in the first account; and mobile device detail data associated with the mobile device from which the transaction request was received;

confirming authenticity of the user using the mobile device detail data and the SSL encrypted account data for the first account;

wherein confirming the authenticity of the user using the mobile device detail data and the SSL encrypted account data for the first account comprises confirming that the SSL encrypted account data for the first account indicates that the mobile device detail data is associated with the user;

accessing via the IFES, in real time and in response to the receipt of the transaction request, the historical transaction data within the single cohesive architecture;

wherein accessing the historical transaction data within the single cohesive architecture comprises accessing the first historical transaction data associated with the first account at the first institution; and wherein the historical transaction data accessed via the IFES includes historical transaction data that occurs on the same banking day as the receipt of the transaction request;

calculating a first acceptable risk range value according to a search in SSL encrypted form of the stored the converted data associated with at least one attribute of the presented financial item;

creating an acceptable risk range value comprised of a pre-processed grade of prior holder transactions based on identified converted data associated with prior-day transactions stored in the data store and searched in SSL encrypted form according to the MAC;

calculating a score for the presented financial item according to at least one attribute of the presented financial item;

evaluating by the IFES, based on comparison of the score for the presented financial item to the first acceptable risk range value and invoking a second acceptable risk range value determination if the score is outside of the acceptable first risk range value;

after the step of confirming the authenticity of the user and the mobile device, tagging and qualifying the initial transaction data to establish a required bank account holder behavior standard and a required bank item issuer behavior standard; and identifying behavior attributes of the account holder and the item issuer meeting the required bank account holder behavior standard, based on the authenticity of the user and the mobile device and based on the required bank item issuer behavior standard; and transmitting via the IFES to the user via the mobile device a message of approval of immediate funding of the presented financial item following a determination that the score is within the first acceptable risk range value and the second acceptable risk range value, wherein the PII is encrypted by creating a message authentication code (MAC), wherein the creation of the MAC during the encryption of the PII allows for the PII of the one or more account holder to be searched and compared while remaining encrypted, and wherein the second acceptable risk range value determination is based on at least a first institution transaction data created after storage of the converted transaction history data.

2. The method of claim 1, further comprising:

receiving by the IFES, via the network and from the mobile application stored in the mobile device, an indication that the transaction is fraudulent;

transmitting via the IFES and to the mobile device a message of disapproval of immediate funding of the presented financial item following a determination that the score is not within the second acceptable risk range value;

populating a contingency table with the identified bank account holder and the identified item issuer that have been assigned an interim contingency status;

determining, by a post-contingency analysis engine, a change in the interim contingency status of the identified bank account holder and the identified item issuer populated in the contingency table;

updating the interim contingency status of the identified bank account holder and the identified item issuer to a negative status or a positive status; and transmitting a loss notification to at least one of the one or more bank data sources based on the determination that the identified account holder is not to be removed from the contingency table in a format specific to one of the plurality of bank data sources, wherein the post-contingency analysis engine receives additional transaction data from the plurality of bank data sources after the initial transaction data is received and uses the additional transaction data to determine in real-time the change in status of the identified bank account holder and the identified item issuer, wherein the assignment of an interim contingency status of an interim contingency status invokes a delay in acceptance of an item presented for deposit by the account holder, wherein the transmitted updated information file of the presented of the first financial item containing the indicia of the fraudulent transaction invokes determining by a post-contingency analysis engine in real-time a change in an interim contingency status of the identified bank account holder and the identified item issuer populated in a generated contingency table and updating the interim contingency status of the identified bank account holder and the identified item issuer to a negative status or a positive status, and wherein the updating of the interim contingency status of the identified bank account holder and the identified item issuer to the negative status result in delay of funding presented items by the identified bank account holder.

3. The method of claim 1, wherein the converting of account data comprises converting of data associated with a transaction date, a financial item routing number, a financial item account number, a transacting account number, an item number and a monetary value amount of the item.

4. The method of claim 1, wherein the converting of account data comprises converting of the account data comprises data associated with a returned item.

5. The method of claim 1, wherein the converting of account data comprises converting of data associated with a user account number, a user account type, an account open date, a relationship date, a current account balance, an average account balance, a total relationship balance, a tax identification number, and a bank product code.

6. The method of claim 1, wherein the converting of account data comprises converting a charge off file associated with at least one closed account of the financial institution having a negative balance.

7. The method of claim 1, wherein the presented financial item is received by the financial institution via the mobile device.

8. The method of claim 1, wherein the presented financial item is received by the financial institution via a teller terminal.

9. The method of claim 6, wherein the presented financial item is received by the financial institution via an automatic teller machine.

10. The method of claim 1, wherein the calculating of the first acceptable risk range value further comprises selecting, from among a plurality of different sets of risk rules, a first set of risk rules based on a determined identity of the first institution, the selected first set of risk rules being previously assigned to the first institution for processing of presented item funding requests at the first institution.

11. The method of claim 3, wherein the second acceptable risk range value determination is determined from a second set of risk rules that is different from the first set of risk rules and that is associated with the first institution and the holder.

12. The method of claim 1, wherein the extracted and transformed data files are sourced to a plurality of financial institutions.

13. The method of claim 1, further comprising:

invoking a comparison of the value determined from an attribute of the presented transaction item with the second acceptable risk range value if the value determined from an attribute of the presented transaction item is not within the first acceptable risk range value.

14. The method of claim 1, wherein the extracted and transformed transaction data files are sourced to a plurality of disparate data sources.

15. The method of claim 1, further comprising electronically receiving identifying information associated with the presented financial item and historical transaction data of an originator of the presented transaction item.

16. The method of claim 1, wherein the extracted and converted data files comprise a history of transactions presented by the holder and processed by the first institution.

17. The method of claim 1, wherein the attribute of the presented transaction item includes time, date, and transaction disposition information for item processing transactions performed between the holder and the first institution.

18. The method of claim 1, further comprising transmitting a fraud notification following the user's transaction that invoked the eligibility process to determine if the presented transaction item is eligible for immediate funding.

* * * * *